US010802507B2

(12) United States Patent
Misfeldt

(10) Patent No.: US 10,802,507 B2
(45) Date of Patent: Oct. 13, 2020

(54) AERIAL VEHICLES AND CONTROL THEREFOR

(71) Applicant: Ansel Misfeldt, Cupertino, CA (US)

(72) Inventor: Ansel Misfeldt, Cupertino, CA (US)

(73) Assignee: Ansel Misfeldt, Cupertino, CA (US)

( * ) Notice: Subject to any disclaimer, the term of this patent is extended or adjusted under 35 U.S.C. 154(b) by 382 days.

(21) Appl. No.: 15/942,421

(22) Filed: Mar. 30, 2018

(65) Prior Publication Data

US 2019/0302802 A1 Oct. 3, 2019

(51) Int. Cl.
*G05D 1/08* (2006.01)
*B64C 13/04* (2006.01)
*B64C 39/02* (2006.01)

(52) U.S. Cl.
CPC ....... *G05D 1/0808* (2013.01); *B64C 13/0423* (2018.01); *B64C 39/024* (2013.01); *B64C 2201/027* (2013.01); *B64C 2201/108* (2013.01); *B64C 2201/146* (2013.01)

(58) Field of Classification Search
None
See application file for complete search history.

(56) References Cited

U.S. PATENT DOCUMENTS

2014/0339372 A1* 11/2014 Dekel ................... B64C 39/024
244/7 R
2015/0197335 A1* 7/2015 Dekel ..................... B64C 27/52
701/5

* cited by examiner

*Primary Examiner* — Richard M Camby
(74) *Attorney, Agent, or Firm* — Moses Xie

(57) ABSTRACT

A method for turning an aerial vehicle such as a drone-type vehicle is provided, according to one embodiment. The method provides for receiving a turning input and detecting a current momentum of the aerial vehicle. The method provides for converting the turning input into a yaw command and calculating a change in yaw associated with the turning input. The method provides for calculating a roll command based on the current momentum of the aerial vehicle and based on the change in yaw associated with the turning input. Further, the method provides for executing the yaw command and the roll command in synchrony, wherein the executing the yaw command and the roll command in synchrony causes the aerial vehicle to perform a turn.

20 Claims, 19 Drawing Sheets

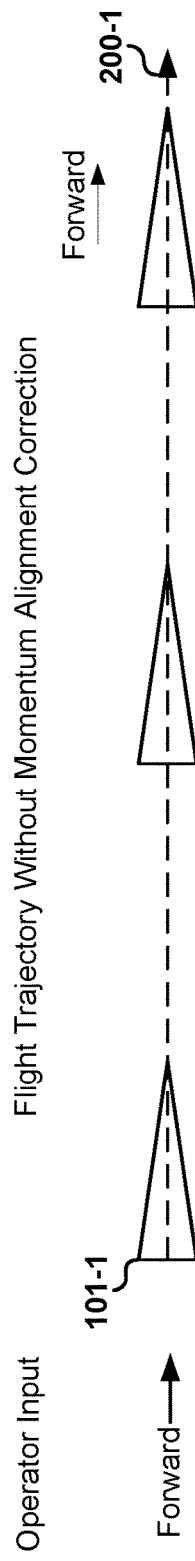
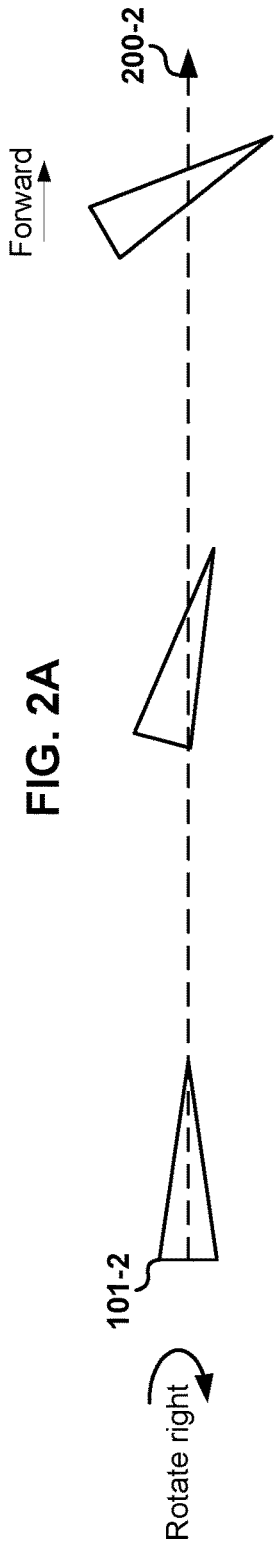
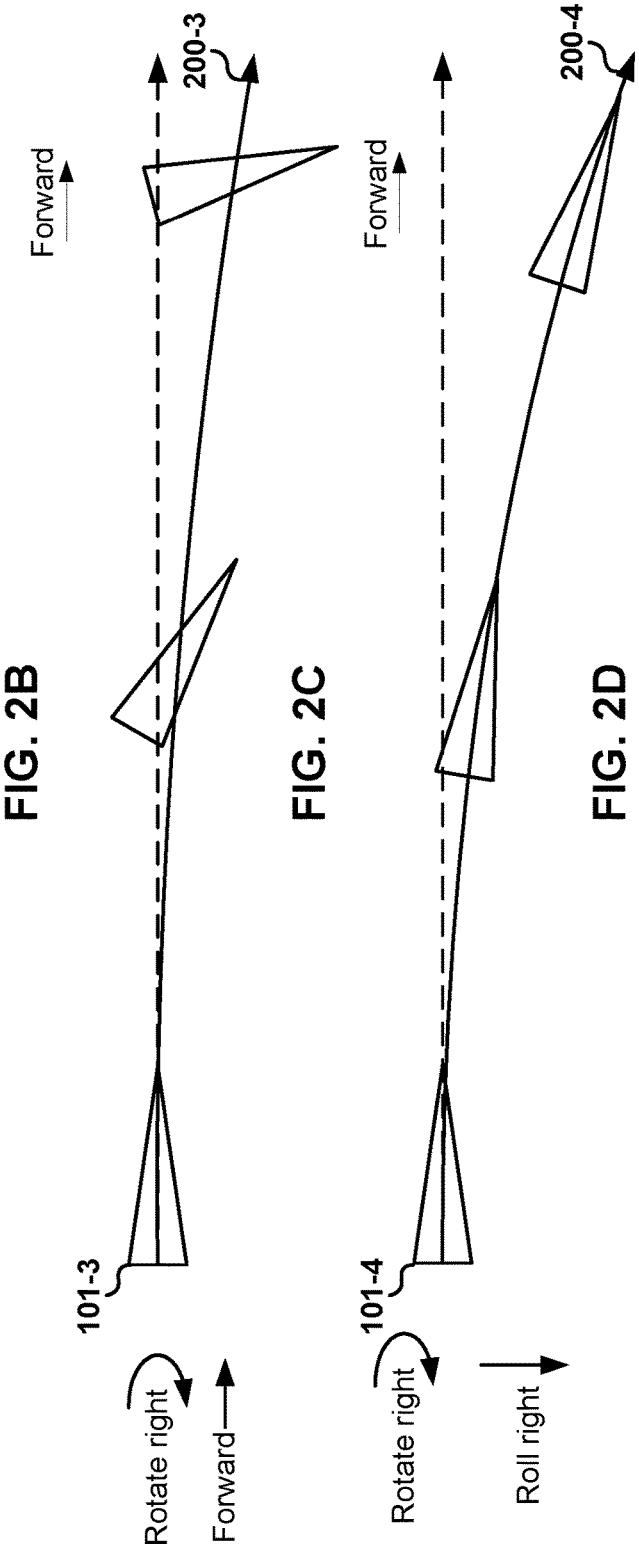
FIG. 2A
FIG. 2B
FIG. 2C
FIG. 2D

Fight characteristics without momentum alignment correction for a yaw input

Fight characteristics without momentum alignment correction for a yaw input

Momentum Alignment Correction for a Turn In Progress

AERIAL VEHICLES AND CONTROL THEREFOR

FIELD OF THE DISCLOSURE

The present disclosure relates generally to manned and unmanned aerial vehicles, and more particularly to user control systems that enable a user to control a change of direction of the aerial vehicle.

BACKGROUND

Aerial vehicles such as drones and vertical and take-off and landing (VTOL) vehicles can be unintuitive to control. This is especially true for novice pilots. The difficulties in piloting an aerial vehicle, whether manned or unmanned, stem from a number of fundamental differences between the physics of an aerial vehicle and that of more familiar vehicles having wheels. Wheeled-vehicles, such as bicycles, cars, motor bikes, all-terrain vehicles (ATVs), scooters, hoverboards, etc., experience static friction with the ground through their wheels. Wheeled vehicles are not only propelled through contact with the ground via static friction, but also navigate turns via static friction. For example, when a bicycle turns, the front wheel guides the bicycle in the direction of the turn. As the bicycle turns, the momentum of the bicycle is aligned with the bicycle's direction (e.g., the direction the bicycle is pointed). The alignment of the bicycle's momentum with its orientation is maintained throughout the turn. For an operator of the bicycle, such an alignment is intuitive and familiar, as the operator can simply "point and go" while riding the bicycle.

Aerial vehicles such as manned aerial vehicles (MAV) and unmanned aerial vehicles (UAV) must navigate turns in a much different manner because of their lack of static friction with a surface. Often, MAVs may be oriented in a direction that is different that its momentum. For example, to have an MAV turn in a manner similar to a bicycle, the pilot must separately rotate the vehicle (e.g., change the vehicle's yaw) and change the vehicles momentum (e.g., change the vehicle's roll) at the same time and at precise magnitudes. For many aerial vehicles, such a turn would require input using separate input controls. In most commercially available drones, for example, a control unit may have a joystick that controls altitude (e.g., thrust) and yaw and a separate joystick that controls pitch and roll. Thus, in order to navigate a turn similar to a wheeled vehicle where momentum and orientation/directionality are aligned, a pilot is required to precisely control a yaw input with one hand and a roll input with the other. Such a concerted input is unintuitive and difficult to learn. Further, current control and input methods for aerial vehicles may hamper the ability of operators to control manned aerial vehicles in a familiar and comfortable manner.

It is in this context that embodiments arise.

SUMMARY

Embodiments of the present disclosure relate to methods and systems for controlling the behavior of an aerial vehicle (AV).

In one embodiment, a method for turning an aerial vehicle is provided. The method includes receiving, at the aerial vehicle, a turning input. The method includes detecting a current momentum of the aerial vehicle. Further, according this embodiment, the method provides for converting the turning input into a yaw command and calculating a change in yaw associated with the yaw input. The method also provides for calculating, in response to the turning input, a roll command based on the current momentum of the aerial vehicle and based on the change in yaw associated with the turning input. Additionally, the method provides for executing, by the aerial vehicle, the yaw command and the roll command in synchrony, wherein the executing the yaw command and the roll command in synchrony causes the aerial vehicle to perform a turn.

In another embodiment, an aerial vehicle is provided. The aerial vehicle includes one or more sensors for determining a momentum of the aerial vehicle, a single axis turning device for receiving yaw inputs, and a body for supporting a pilot. The aerial vehicle also includes a flight computer for converting the yaw inputs into yaw commands, the flight computer includes a momentum alignment correction module for generating roll commands operable to adjust a roll of the aerial vehicle based on the yaw commands and based on the momentum of the aerial vehicle. The aerial vehicle further includes a plurality of propulsion units for executing the yaw commands and the roll commands, the executing the yaw commands and the roll commands causes the aerial vehicle to navigate a turn.

In another embodiment, a method for controlling an aerial vehicle is provided. The method includes receiving a yaw input from a user of the aerial vehicle and detecting a momentum of the aerial vehicle. The method also provides for calculating, in response to the yaw input, a rate of change in yaw of the aerial vehicle based on the yaw input. Further, the method provides an operation for calculating, in response to the yaw input, a roll command based on the yaw input and the momentum of the aerial vehicle, the calculating the roll command includes determining a change in a direction of the momentum required to match the rate of change in yaw of the aerial vehicle. Additionally, the method provides for executing, by propeller units associated with the aerial vehicle, the change in yaw and the roll command in unison. In some embodiments, the executing the change in yaw and the roll command in unison causes the aerial vehicle to navigate a turn, wherein an orientation vector and a momentum vector of the aerial vehicle are aligned during the turn.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIGS. 2A-2D show conceptual illustrations of flight characteristics of a frictionless vehicle in response to various inputs, according various embodiments.

DETAILED DESCRIPTION

Figure 1:
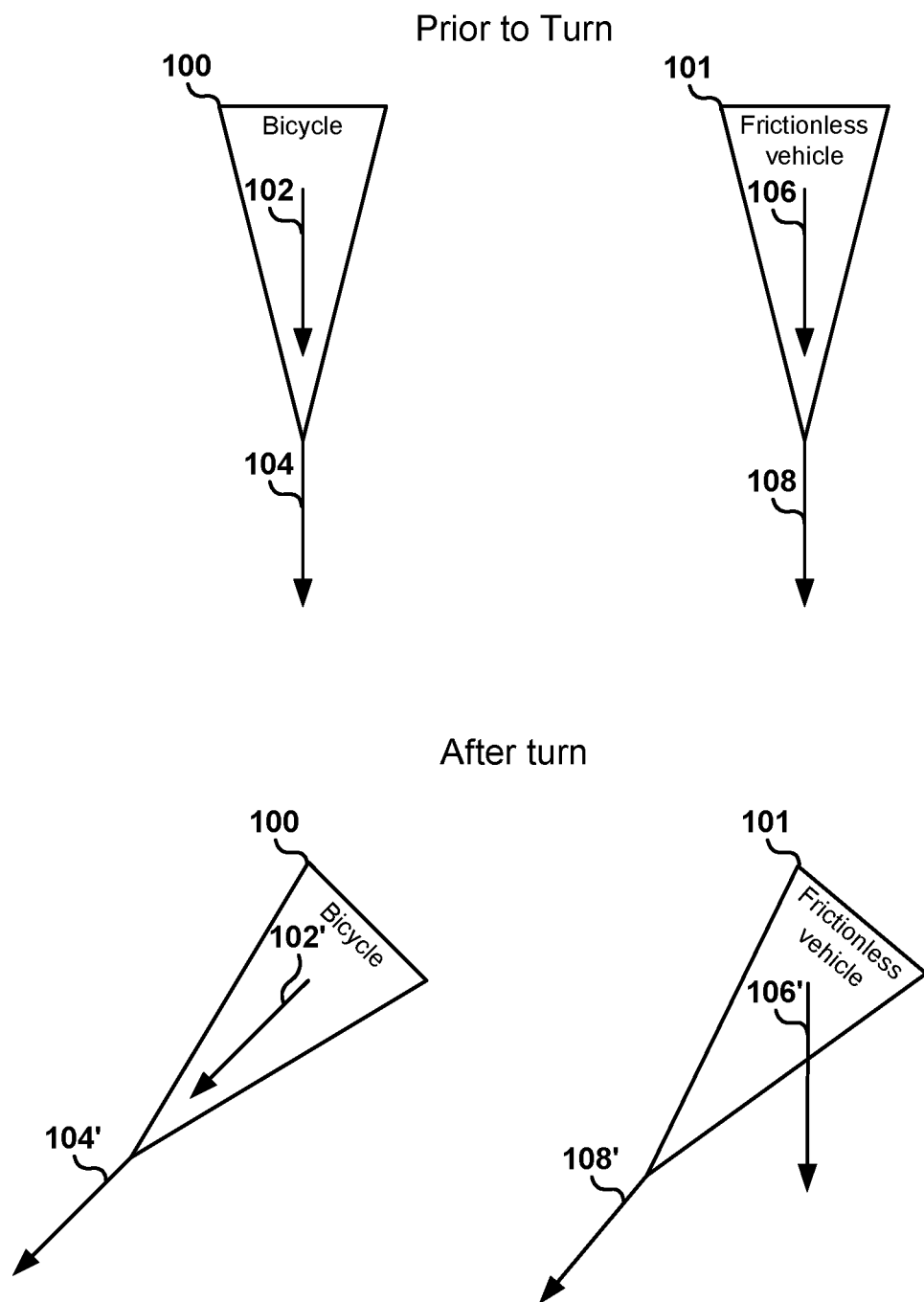
FIG. 1 is a conceptual illustration of certain differences between how a ground vehicle and how an aerial vehicle experience rotation, according to one embodiment.

The following embodiments describe methods, computer programs, and apparatuses relate generally to controlling the flight behavior of aerial vehicles (AVs), and more particularly to improving the intuitiveness of how an AV navigates turns. It will be obvious, however, to one skilled in the art, that the present disclosure may be practiced without some or all of these specific details. In other instances, well known process operations have not been described in detail in order to not unnecessarily obscure the present disclosure.

Aerial vehicles, and more particularly drone-type aerial vehicles, are not as intuitive to operate as ground vehicles, especially as it relates turning. Ground vehicles such as automobiles, bicycles, motorcycles, scooters, hoverboards and the like, are more intuitive to turn because the turning of a ground vehicle changes the momentum vector of the vehicle to match the magnitude of the turn. Generally speaking, a grounded vehicle's momentum vector will consistently match directionality vector (e.g., the vehicle faces the same direction it travels). This change in the momentum vector is caused by an acceleration of the ground vehicle in the direction of the turn, the force for which is provided by the static friction between the wheels or tires and the ground. As a result, the vehicle is able to "push off" of the points of contact between the ground vehicle and the ground to cause a change in the direction of the vehicle's momentum.

Generally, there is a degree of alignment between the ground vehicle's orientation (e.g., the direction the vehicle is facing) and its momentum vector, although it may take a period of time between the moment of turning of a ground vehicle and the time the momentum vector "catches up" to the direction of the turn. Such an alignment between momentum and orientation feels natural to human operators. When alignment between momentum and orientation is disrupted, as may be the case when a car spins out or hydroplanes, the average human operator is at a loss for controlling the vehicle in this non-aligned state.

Drone-type AV's such as quadcopters are in a constant state of non-alignment. Conventionally speaking, an AV's momentum vector is independent of its orientation. For example, when a north-traveling and north-facing AV is given a westward yaw input, the result may be a west-facing AV that is still traveling in the north-facing direction. If an operator wishes instead to make a full 90° turn toward the west while also facing the west the operator must manually decrease the AV's northward momentum to zero, increase the AV's westward momentum, and change the yaw of the AV by 90°.

To navigate such a turn with considerable speed while maintaining momentum-to-orientation alignment, as would be automatic in a ground vehicle, is extremely difficult even for more experienced operators. What is desired, therefore, are methods and systems that enable an AV, both manned and unmanned, to be able to navigate turns with momentum-to-orientation alignment (e.g., alignment between an AV's momentum vector and its direction vector). Embodiments described here are for manned aerial vehicles (MAVs) and unmanned aerial vehicles (UAVs) and methods for their control that enable momentum-to-orientation aligned turning through momentum alignment correction (MAC) processes. Such embodiments are contemplated to be technological improvements upon current MAVs and UAVs for their ability to automatically correct the AV's momentum vector to align with the AV's orientation, which provide for more intuitive flight characteristics as well as human-machine interfacing. It is also contemplated that certain embodiments described here that implement automatic momentum alignment correction (MAC) may also mimic the turning characteristics and experience of ground vehicles for frictionless vehicles. Such mimicking is also envisioned to be a technological improvement to the way AVs behave such that operators are provided with familiar, intuitive, and predictable flight characteristics and responsiveness.

As used herein, the term "momentum vector" is used to refer to the magnitude and direction associated with an object's momentum.

As used herein, the term "directionality vector" is used to refer to the direction in which an object such as a vehicle is facing.

As used herein, "alignment" between two vectors is used to refer to states in which the two vectors are facing in the same direction, generally. Alignment does not necessarily refer to co-linearity or co-directionality, per se.

As used herein, "frictionless" vehicle is meant to denote a vehicle that does not experience friction from the ground during normal operation, but that may, and does, experience friction in other ways, for example, by way of drag, etc.

FIG. 1 shows a conceptual illustration of certain differences between how a ground vehicle and how a frictionless vehicle such as an aerial vehicle experience a change in yaw or rotation, according to one embodiment. When bicycle 100 is traveling along a forward path prior to a turn, its momentum vector 102 and its direction vector 104 are aligned. That is, for example, the bicycle 100 faces in a direction that corresponds to a direction of its momentum. A frictionless vehicle 101 such as a drone-type aerial vehicle is also shown to also have a momentum vector 106 that is aligned with its direction vector 108 prior to a turn, similar to the bicycle 100.

After the bicycle 100 turns toward the right, its direction vector 104' after the turn and its momentum vector 102' after the turn are shown to both be directed to the right. Notably, the momentum vector 102' remains aligned with the direction vector 104' after the turn. Generally, most wheeled vehicles will have a momentum that maintains alignment with its directionality. Having a momentum vector that aligns with directionality vector makes intuitive sense for an operator of a wheeled vehicle such as bicycle 100, because human are accustomed to facing the direction in which they move. For example, when a human walks or runs, his or her natural or default head position faces in the same direction that he or she is traveling.

Current drone-type AVs are not configured to maintain a momentum vector that is aligned with its directionality vector. Instead, current drone-type AVs are configured to have a momentum component and an orientation component that are independently controlled. For example, FIG. 1 shows the momentum vector 106' of the frictionless vehicle 101 to no longer be aligned with the direction vector 108' of the frictionless vehicle 101 after the turn. In particular, the direction 108' is shown to be facing toward the right after the turn, while the momentum vector 106' still faces the same direction as momentum vector 106 prior to the turn. This may occur, for example, if an operator of the frictionless vehicle 101 provides a yaw input alone. As a result, the direction vector 108' of the frictionless vehicle 101 without affecting the momentum vector 106' in current AVs. The result is a frictionless vehicle 101 that does not travel in the same direction that it faces.

FIGS. 2A-2D show conceptual illustrations of flight characteristics of frictionless vehicles in response to various inputs, according various embodiments. FIG. 2A shows a scenario in which a frictionless vehicle 101-1, such as a drone-type AV, is provided a forward input while already moving in a forward direction. Accordingly, the frictionless vehicle 101-1 travels in a forward direction along a trajectory 201-1. Since the frictionless vehicle 101-1 is already moving in a forward direction, it could also travel along trajectory 201-1 even without a forward input.

FIG. 2B shows a scenario in which a frictionless vehicle 101-2 begins with a forward momentum and is provided with an input to rotate right. The frictionless vehicle 101-2 is shown to rotate toward the right as a result of, for example, a yaw input to rotate right. However, the trajectory 200-2 associated with the frictionless vehicle 101-2 does not curve to the right. Instead, the trajectory 200-2 remains in a forward direction. Once the frictionless vehicle 101-2 begins rotating toward the right, its momentum vector and its direction vector are no longer aligned. For example, the frictionless vehicle 101-2 is shown to be facing toward the right while its momentum vector is directed forward throughout its trajectory.

FIG. 2C shows a scenario in which a frictionless vehicle 101-2 begins traveling along trajectory 200-3 with a forward momentum. The frictionless vehicle 101-3 is then provided a rotate right input and a forward input. As a result, the frictionless vehicle 101-3 experiences a clockwise rotation as well as an acceleration toward the right. The frictionless vehicle 101-3 thus travels along a trajectory that curves toward the right. Any rightward momentum depends upon the frictionless vehicle 101-3 first rotating clockwise before accelerating forward in the rightward direction. As a result, the frictionless vehicle 101-3 has a momentum vector that is not aligned with its direction vector. For example, at almost all points along trajectory 200-3, the frictionless vehicle 101-3 has a direction vector that is pointed toward the right to a greater magnitude than its momentum vector.

FIG. 2D shows a scenario in which a frictionless vehicle 101-4 begins traveling along trajectory 200-4 with a forward momentum. The frictionless vehicle 101-4 is then provided with a "rotate right" and a "roll right" input. In some embodiments, the "rotate right" and the "roll right" inputs are provided simultaneously throughout it's the trajectory 200-4. The resulting trajectory 200-4 is shown therefore to curve to the right, similar to trajectory 200-3. However, unlike in FIG. 2C, the frictionless vehicle 101-4 is shown to maintain a momentum vector that is aligned with its direction vector throughout trajectory 200-4. For example, when the frictionless vehicle 101-4 is caused to roll right in simultaneity with its rotating right, the frictionless vehicle 101-4 experiences a rightward acceleration such that its trajectory 200-4 curves to the right. The simultaneous rolling right of the frictionless vehicle 101-4 along with its rotating right causes the momentum vector of the frictionless vehicle 101-4 to be continually aligned with its direction vector. That is, for example, frictionless vehicle 101-4 of FIG. 2D is consistently facing in the same direction that it travels (e.g., it's momentum vector is aligned with its direction vector).

Embodiments described herein are for system and methods that enable a frictionless vehicle such as a drone-type AV to maintain alignment of the vehicle's momentum vector with its direction vector. In certain embodiments, such alignment is achieved through a process of momentum alignment correction (MAC). MAC corrects or adjusts the momentum directionality of an AV such that its momentum vectors are consistently the same or close to same as the direction vector of the AV. In some embodiments, MAC is enabled to consistently maintain such an alignment to within about 0.01° to about 45°, or about 0.1° to about 10°, or about 0.5° to about 5°. An AV having MAC as described herein is therefore enabled to have turning characteristics such that the AV consistently travels in a direction that corresponds to a direction it faces. For example, an operator of such an AV with MAC will find that the AV consistently moves in the same or similar direction that the operator directs the AV. As will be discussed in more detail below, MAC enables the AV to be operated and turned with a single axis of turning input as opposed to requiring an input for rotation and a simultaneous input for roll.

Figure 3A:
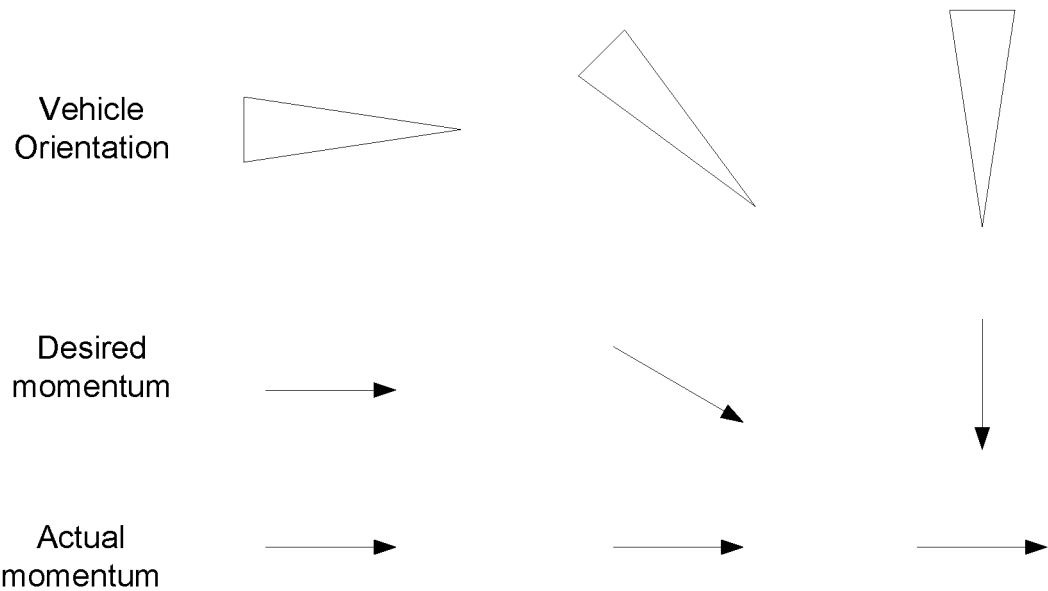
FIGS. 3A-3B show conceptual illustrations of how a frictionless vehicle behaves with and without momentum alignment correction, according one embodiment.
Figure 3B:
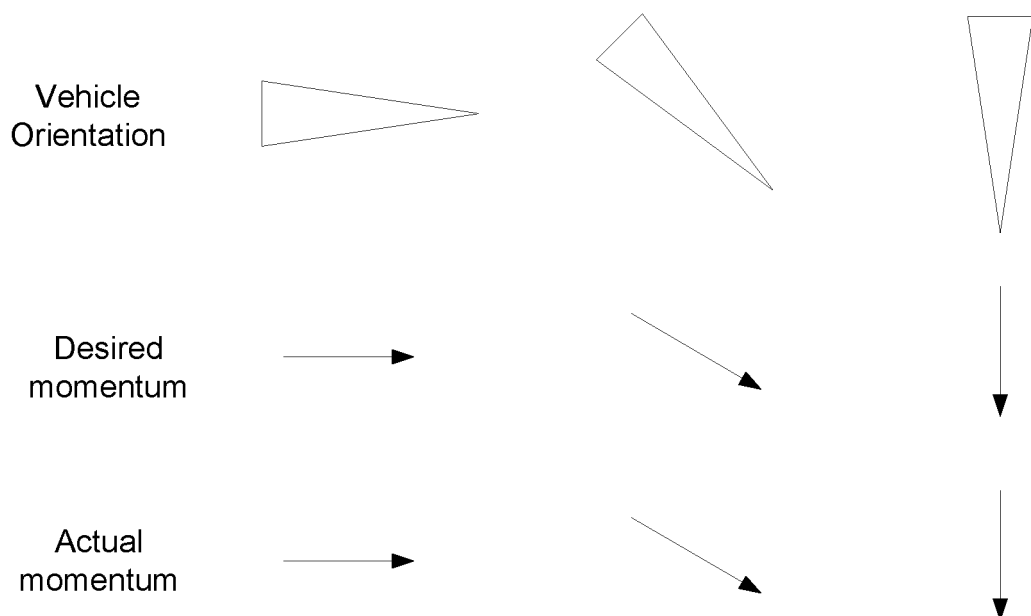

FIGS. 3A-3B show conceptual illustrations how a frictionless vehicle behaves with and without momentum alignment correction, according one embodiment. In FIG. 3A, turning characteristics of an AV without MAC are shown. When the AV is moving in a forward direction prior to a turn, its momentum vector faces in the same direction as the vehicle's orientation. After the AV is rotated toward the right, the actual momentum of the AV continues to be directed forward while the vehicle is directed toward the right. The desired momentum corresponds to the vehicles orientation. As a result, the actual momentum does not align with either of the vehicle orientation or the desired momentum after the turn.

In contrast, FIG. 3B shows the certain turning characteristics of an AV with methods and system of MAC described herein. In particular, the AV is shown to consistently have an actual momentum that corresponds to both the desired momentum and the vehicle orientation throughout a turn. As a result, an AV with MAC will enable the AV to consistently correct or adjust the directionality of its momentum to match that of its orientation. Thus, the MAC-enabled AV will turn such that the actual momentum will be similar to a desired momentum.

Figure 4:
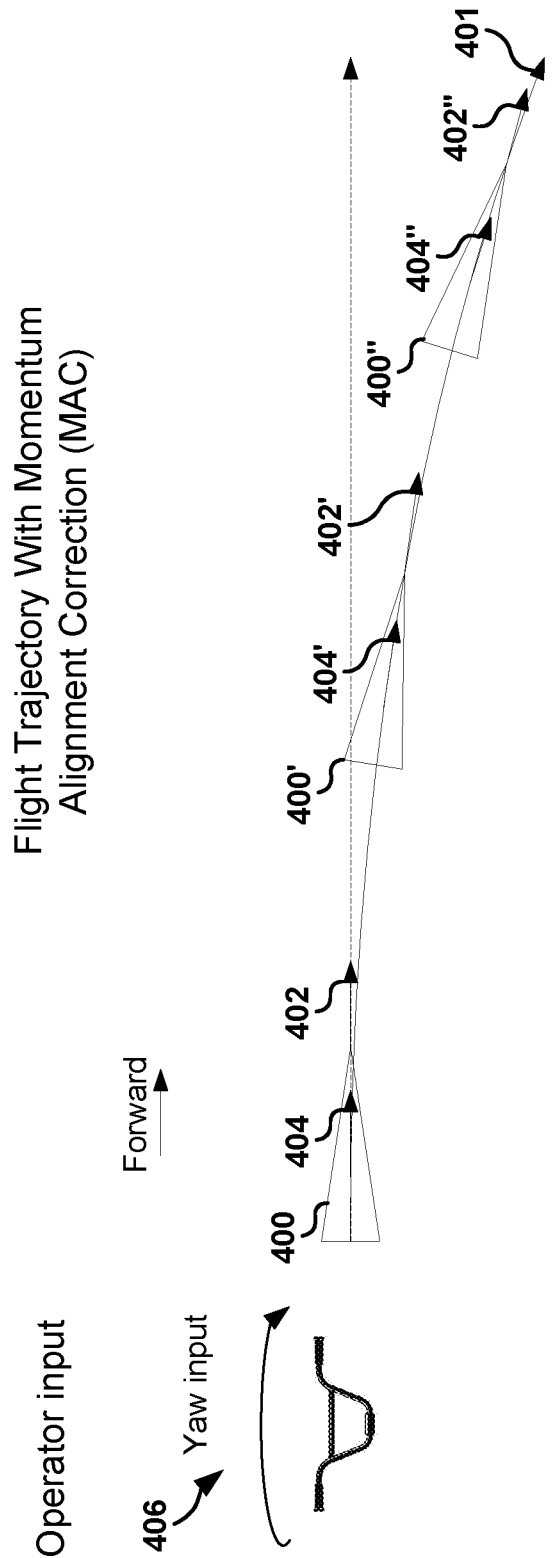
FIG. 4 shows a conceptual illustration how an aerial vehicle navigates a turn with momentum alignment correction (MAC) in response to a single axis turning input, according to one embodiment.

FIG. 4 shows a conceptual illustration how an aerial vehicle navigates a turn with momentum alignment correction (MAC) in response to a single axis turning input, according to one embodiment. According to some embodiments, a single axis turning input refers to a mode of operator input that involves mechanical input along a single radial, rotational, tilt, or linear axis. For example, a single axis turning input may include a steering wheel of an automobile, a handlebar of a bicycle or motorcycle, a joystick when tilted along a linear axis, or any other turning input mechanism that is manipulated along or around a single axis.

In the embodiment shown in FIG. 4, an AV 400 is shown to be traveling in a forward direction. The AV 400 is shown to have a direction 402 and a momentum 404 that is also in the forward direction. Also shown in FIG. 4 is a single axis turning input includes handle bar that receives a turning input 406 for turning toward the right. In response to the turning input 406, the AV 400' is shown to have a direction 402' that points toward the right. The AV 400' is also shown to have a momentum 404' that is pointed in the same direction as direction 402' as a result of momentum alignment correction. As will be discussed in more detail below, MAC is able to achieve alignment between momentum 404' and direction 402' due to a specific mapping process by that is implemented by a flight computer or a module therein of the AV 400'. Briefly, however, the MAC module of the flight computer maps the turning input 406 into signals that are distributed to various motors of the AV 400'. The mapping of the turning input 406 cause the AV 400' to rotate in a yaw axis to the right and to tilt in the roll axis also to the right. The rotation in the yaw axis and the tilt in the roll axis are performed simultaneously by the MAC and causes the momentum 404' to be aligned with the direction 402' of the AV 400' during the portion of the turn shown in FIG. 4.

The MAC continues to correct or adjust the momentum 404" such that it matches direction 402" of AV 400" at a more advanced stage of the trajectory 401. It is contemplated that as the turn continues in trajectory 401, the MAC will continue to ensure that momentum of the AV 400 is directed in the same direction that the AV 400 is pointed toward. While the AV 400 will generally have a momentum 404 that is aligned with its direction 402, it is noted that at certain stages or portions of the turn that the degree of alignment may not be consistent. For example, the MAC may be configured to make certain adjustments during a turn in which the momentum 404 of the AV 400 is as aligned with its direction 402 because certain adjustments or corrections in momentum 404 may cause the momentum 404 to momentarily not be as aligned with direction 402.

In some embodiments, it is contemplated that MAC may be switched on and off. For example, when MAC is switched off, then the aerial vehicle 400 may not turn in the manner shown in FIG. 4 with the momentum vector of the aerial vehicle aligned with its orientation vector (e.g., direction the aerial vehicle faces). It is further envisioned that if MAC is switched on when the aerial vehicle is not in a state of alignment, then the MAC processes carried out by the aerial vehicle will then be configured to achieve a state of alignment.

Figure 5A:
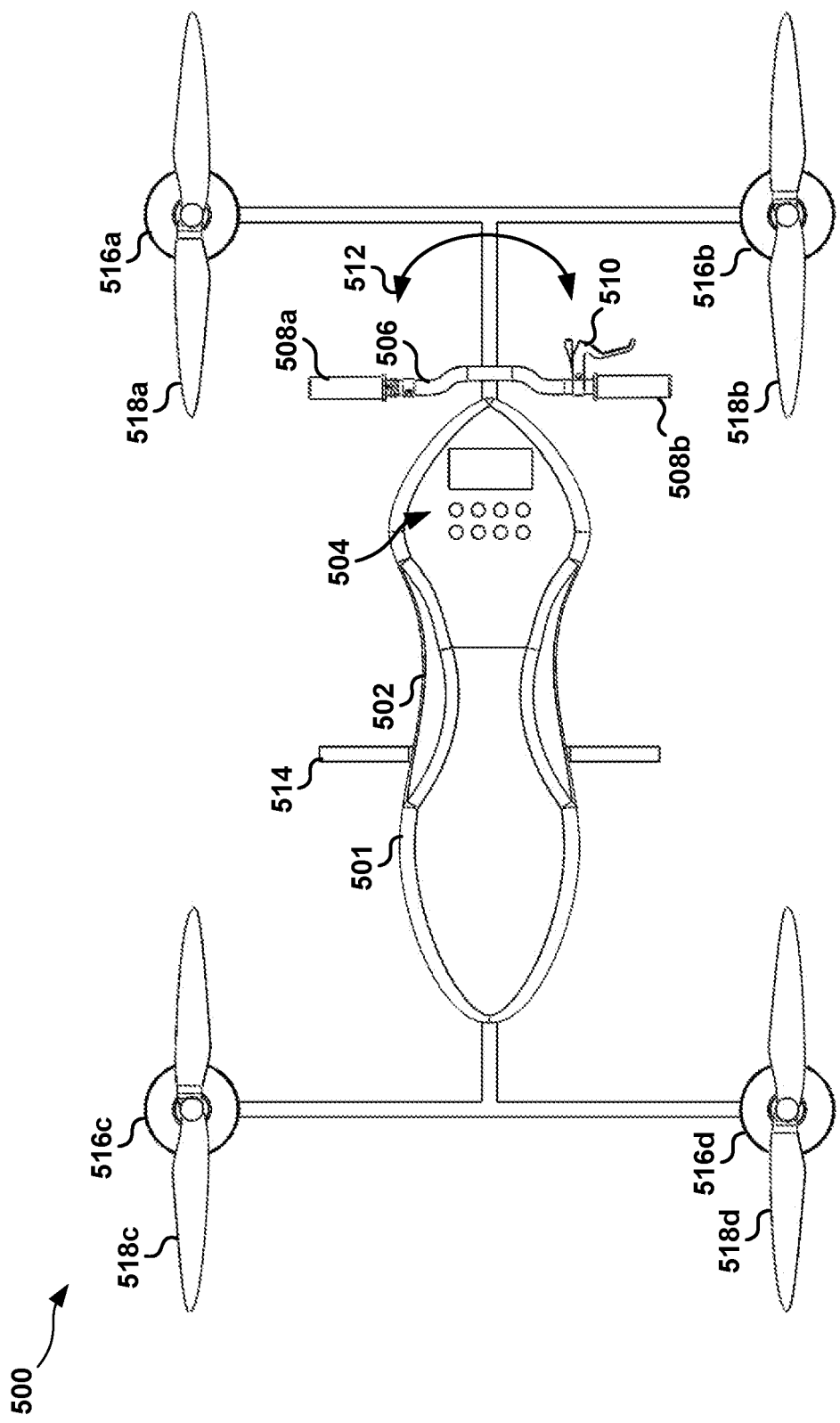
FIG. 5A shows a hoverbike embodiment of an aerial vehicle that may be implemented with the MAC processes described herein, according to one embodiment.

FIG. 5A shows a hoverbike 500 embodiment of a drone-type aerial vehicle that may be implemented with the methods and systems of momentum alignment correction (MAC) described herein. The hoverbike 500 includes a main body 501, a seat 502 for an operator to sit, foot pegs 514 for an operator to place their feet, a control panel 504 for interfacing with various parameters of the hoverbike 500, a handlebar 506 for controlling the hoverbike 500 and for causing the hoverbike 500 to make turns. The handlebar 506 is a single axis turning mechanism that receives mechanical input along a single rotational axis, in some embodiments. For example, the handlebar 506 is capable be manipulated to turn to the right or turn to the left according to input directionality 512. Input directionality 512 of handlebar 506 shows the handlebar 506 can at least be rotated to the right and to the left, similar to, for example, a handlebar on a bicycle or a motorcycle, according to some embodiments.

As will be discussed in more detail below, the rotational input provided to the handlebar 506 to turn toward the right or left is an input causes the hoverbike 500 to experience a change in yaw that is simultaneous with a change in roll in circumstances and in some embodiments. In other embodiments, the handlebar 506 may have additional degrees of freedom, for example, that enable the handle bar 506 to be tilted forward or backward, or side to side, to provide some other additional flight-related input to the hoverbike 500. In some embodiments, a tilting of the handlebar 506 forward may cause the hoverbike 500 to decrease its altitude, whereas titling the handlebar 506 backwards causes an increase in the altitude in the hoverbike 500.

The hoverbike 500 of FIG. 5A also includes four motors 516a-516d that drive four propellers 518a-518d. The motors 516a-516d and propellers 518a-518d provide lift to the hoverbike 500 as well as propulsion in various directions. In some embodiments, a unit of a propeller and a corresponding motor may be referred to a propulsion unit. Although the hoverbike 500 embodiment is shown to include four propellers and four motors, it will be understood that other embodiments may include a different number of propellers and motors, and that such embodiments do not depart from the spirit and scope of the present embodiments. For example, it is envisioned that various embodiments may include between 3-100 propulsion units, or between 4-64 propulsion units, or between 4-16 propulsion units.

The handlebar 506 of the hoverbike 500 embodiment of FIG. 5A is also shown to include grips 508a and 508b, as well as a brake lever 510. The grips 508a and 508b may be stationary grips in some embodiments. In other embodiments, one or both of grips 508a and 508b may be configured to receive a rotational input similar to a motorcycle or scooter grip. The rotational input may be operable to control a forward momentum or speed of the hoverbike 500. In some embodiments, the hoverbike 500 may be such that the right hand grip 508b is configured to receive a rotational input that maps to forward propulsion of the hoverbike 500, similar to a motorcycle or scooter. In various embodiments, the brake lever 510 may receive a clasping input that causes the hoverbike 500 to slow down. For example, if the hoverbike 500 is traveling in a forward direction, the brake lever 510 may be operable to decrease the momentum of the hoverbike 500 in the forward direction. The brake lever 510 may be responsive to an amount of force that is applied to it such that the amount of braking force desired can be modulated via the brake lever 510.

A flight computer (not shown) receives inputs from, for example, the handlebar 506 being rotated left or right for turning, the grip 508b being rotated for acceleration, and the brake lever 510 for deceleration. The flight computer maps each of these inputs to the propulsion units including motors 516a-516d and propellers 518a-518d, as well as electronic speed controllers (ESCs), for causing the hoverbike 500 to behave in a desired manner. The flight computer (not shown) will include a module that is implemented as software, hardware, or firmware, which implements the processes associated with momentum alignment. As a result, the flight characteristics of the hoverbike 500 will be such that its momentum (e.g., the direction the hoverbike 500 travels) matches a directionality of the orientation of the hover bike 500 (e.g., the direction the hoverbike 500 faces).

Figure 5B:
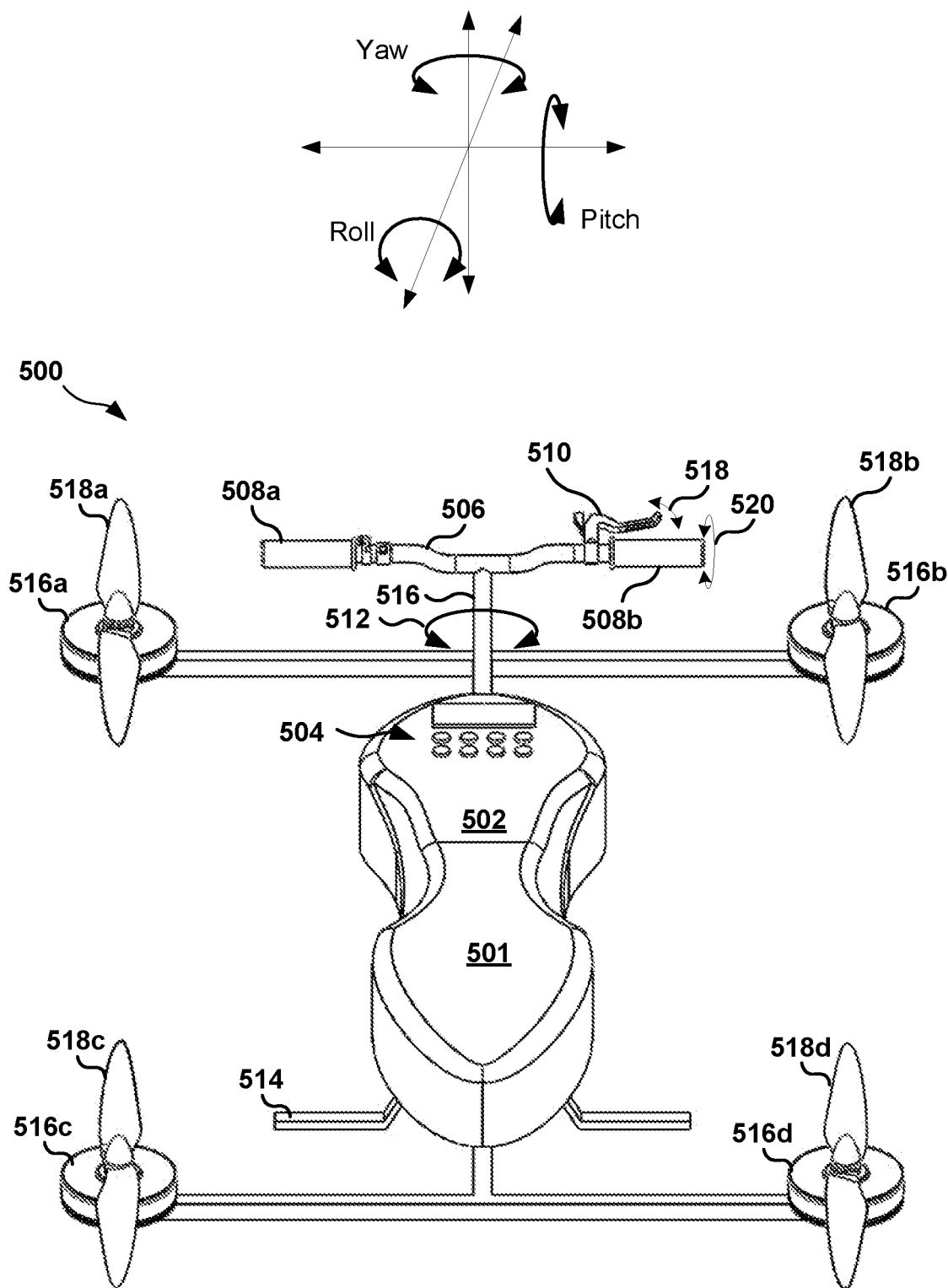
FIG. 5B shows a first person view of the hoverbike embodiment.

FIG. 5B shows a first person view of hoverbike 500, according to one embodiment. In this view, a steering shaft 516 is shown be connected to the handlebar 506 for translating left and right turning inputs from an operator to a module (not shown) that transduces rotational input received by the steering shaft 516 into electrical signals. Further, FIG. 5B shows that grip 508b is configured to be rotated in the direction 520 shown. As noted above, a rotation of grip 508b may be operable to cause acceleration in hoverbike 500. Moreover, brake 510 is shown movement in direction 518 for deceleration of the hoverbike 500, according to one embodiment. As a result, the hoverbike 500 has many of the same input configurations as a motorcycle, and is operable to be ridden in a fashion that is similar to riding a bicycle or motorcycle.

Figure 6:
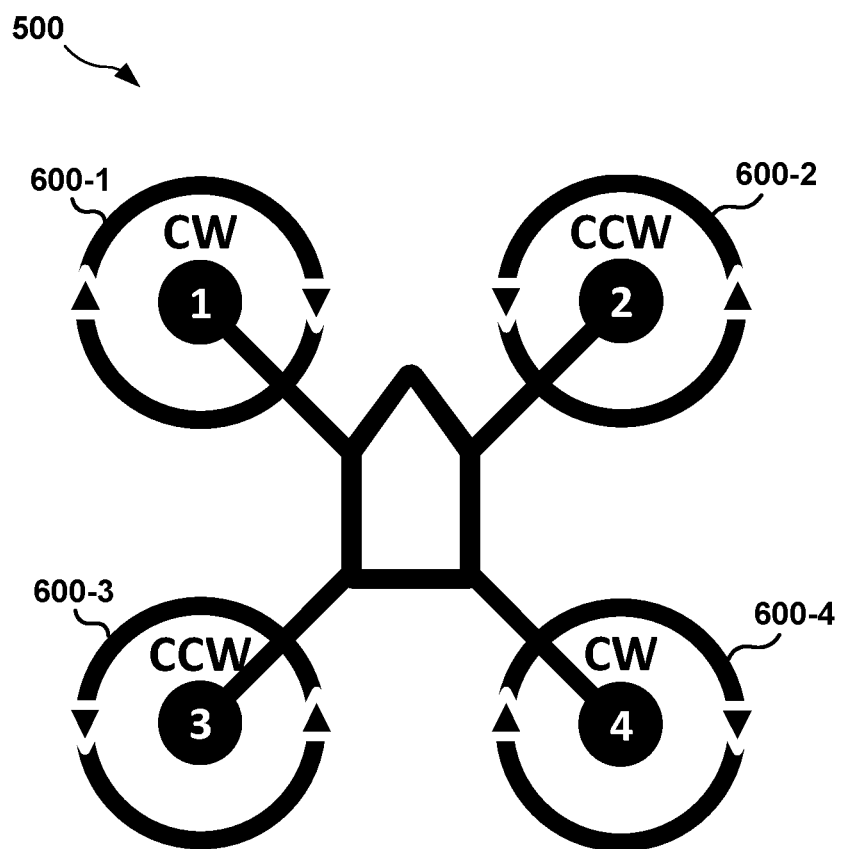
FIG. 6 shows a schematic diagram of an aerial vehicle and associated propulsion units, according to one embodiment.

FIG. 6 shows a schematic diagram of a hoverbike 500 embodiment and its propulsion units 600-1 through 600-4. As noted above, a propulsion unit may include at least a motor, a propeller, and in some embodiments an electric speed controller (ESC) that controls the rotational speed of an associated propeller by modulating power provided to the associated motor. The hoverbike 500 is shown to include four counter-rotating propulsion units. In the embodiment shown, for example, propulsion units 600-1 and 600-4 are configured to rotate in a clockwise direction, while propulsion units 600-2 and 600-3 are configured to rotate in a counter-clockwise direction. In other embodiments, the hoverbike 500 may include propulsions units 600-1 through 600-4 that rotate in the opposite direction as the configuration shown in the FIG. 6. For example, in other embodiments, propulsion units 600-1 and 600-4 may rotate in a counter-clockwise direction, while propulsion units 600-2 and 600-3 rotate in a clockwise direction.

While certain embodiments described herein are made with reference to embodiments including four propellers, it will be appreciated that the principles of momentum alignment correction apply to aerial vehicles with any number of propellers, as long as the various embodiments are enabled to control the roll and yaw of the aerial vehicle simultaneously. Thus, various embodiments may be practiced with varying numbers of propellers without departing from the scope and spirit of the present disclosure. For the sake of clarity, however, FIGS. 7-12B and FIGS. 13A and 13B describe implementations of momentum alignment correction using four propellers.

Figure 7:
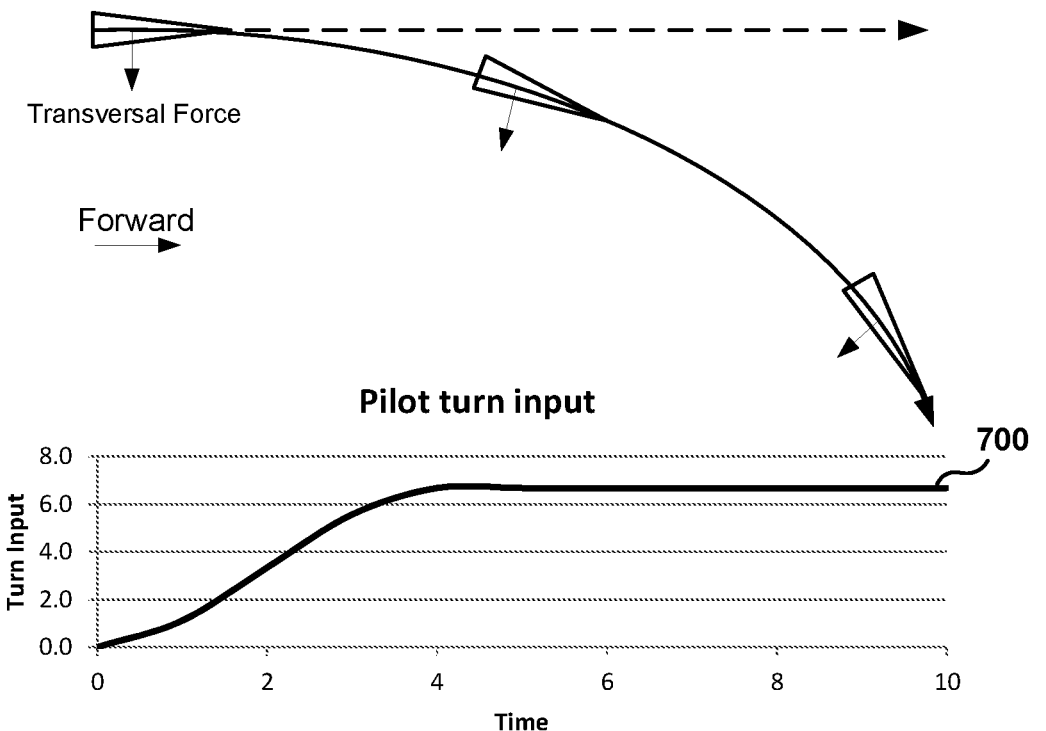
FIG. 7 shows a simulation of how momentum alignment correction enables an aerial vehicle to navigate an in-progress turn while maintaining alignment between its momentum vector and its directionality vector during the in-progress turn, according to one embodiment.
Figure 7:
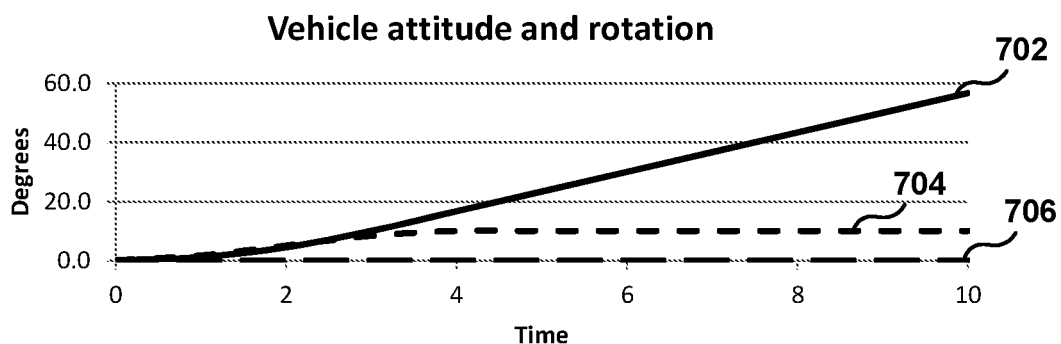
Figure 7:
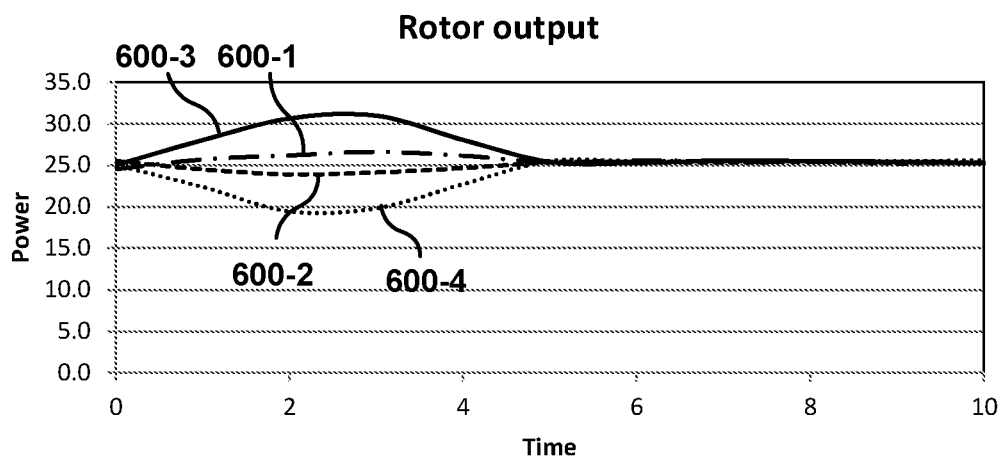

FIG. 7 shows an aerial vehicle navigating a turn that is in-progress with momentum alignment correction. The aerial vehicle is traveling forward with some momentum in the forward direction before receiving a turn input 700, for example, from an operator. The turn input 700 is contemplated to be input via a single axis steering input such as a steering wheel, a handlebar, joystick, or the like. The operator may be traveling with or on the aerial vehicle in some embodiments, or the operator could be remote to the aerial vehicle in other embodiments. The turn input 700 increases from 0 arbitrary units (e.g., no turn input prior to the turn) to about 6.2 arbitrary units over a span of 4 units of time (e.g., 4 seconds) between t=0 and t=4. The turn input 700 remains virtually consistent at 6.2 arbitrary units between about t=4 to about t=10. As a result, the aerial vehicle receives a turn input that increases to a desired magnitude that then stays at the desired magnitude for some time.

The units of time, for example, during the period of t=0 to t=10 is also described in arbitrary units. It is envisioned, however, that the period of t=0 through t=10 in which turning occurs (e.g., in FIGS. 7-12B and 13A and 13B) may represent a period of roughly between about 0.2 seconds to about 30 seconds, or between about 1 second and about 10 seconds, or between about 2 seconds and about 5 seconds.

FIG. 7 shows the yaw 702, roll 704, and pitch 706 associated with the aerial vehicle during the period t=0 to t=10 in response to the turn input 700. For example, the yaw 702 of the aerial vehicle is shown to increase non-linearly for about 4 seconds before increasing at a linear rate for the remainder of the turn. As a result, the aerial vehicle rotates at a consistent angular velocity after about t=4. Also in response to the turn input 700, the aerial vehicle experiences a roll 704 that increases from 0° to about 10°, at which point the roll remains roughly steady. The roll 704 experienced by the aerial vehicle causes it to change the momentum to the right by providing the aerial vehicle with a force toward the right. It should be noted that the initial change in roll 704 may exceed the initial change in yaw 702 towards the beginning of the turning process. Also, pitch 706 is shown to remain at or near 0° because no acceleration input is provided.

The roll 704 experienced by the aerial vehicle is caused by the turn input via a momentum alignment correction process. In the embodiment shown, for example, there is no external roll input. The resulting roll 704 is automatically produced as a result of the momentum alignment correction process derived from the turn input 700. As a result, the aerial vehicle is configured to convert the turn input 700 into both the illustrated change in yaw 702, as well as the change in roll 704 (e.g., without an external roll input). The roll 704 produced by the momentum alignment correction process is configured to introduce a transverse force that aligns the aerial vehicle's momentum with its degree of rotation. For example, at t=4, the aerial vehicle has rotated (e.g., in the yaw axis) roughly 18°. Due to the roll 704 of the aerial vehicle, the momentum of the aerial vehicle should also have a directionality that is roughly 18°. At t=8, for example, the aerial vehicle is shown to have been rotated about 42°. Likewise, at t=8, the momentum of the aerial vehicle should also have a directionality of about 42°.

Generally speaking, the degree of roll 704 is roughly proportional to the change in yaw 702. The following relationship may be used to express the general relationship between the change yaw 702 (e.g., angular velocity) and the roll for aerial vehicles using momentum alignment correction processes to align the directionality of the momentum of the aerial vehicle with its yaw:

$$\frac{d(\text{yaw})}{dt} \propto \text{roll} \quad (1)$$

For example, since the change in yaw 702 between t=6 and t=10 is roughly constant, the magnitude of the roll 704 during the same period is also roughly constant. If the change in yaw 702 is not constant over a period of time, then the magnitude of roll 704 may also not be constant. For example, when there is an acceleration in yaw 702 (e.g., between t=0 and t=4), there a corresponding increase in roll 704.

FIG. 7 shows the power outputs of propulsion units 600-1 through 600-4, using the configuration of the hoverbike 500 as an example embodiment. For illustrative purposes, the effect of drag is not incorporated into the diagrams. Propulsion unit 600-1 is disposed at the front left of the aerial vehicle, propulsion unit 600-2 at the front right, propulsion unit 600-3 at the rear left and propulsion unit 600-4 at the rear right. In the embodiment shown, propulsion units 600-1 and 600-4 rotate clockwise while propulsion units 600-2 and 600-3 rotate counter-clockwise. The total value of power supplied counter-clockwise rotating propulsion units 600-2 and 600-3 is shown to be greater than total value of power supplied to the clockwise rotating propulsion units 600-1 and 600-4. As a result, the aerial vehicle experiences a net torque in the clockwise direction. The net torque in the clockwise direction causes the aerial vehicle to rotate.

The net difference between the power supplied to the counter-clockwise rotating propulsion units 600-2 and 600-3 and the clockwise rotating propulsion units 600-1 and 600-4, and hence the magnitude of the net clockwise torque supplied to the aerial vehicle is shown to reach a maximum at roughly t=3. At time t=3, the aerial vehicle experiences its greatest angular acceleration, which is illustrated by yaw 703. After t=3, the net clockwise torque supplied to the aerial vehicle decreases until it is almost negligible at around t=5. Although there is no longer a net torque on the aerial vehicle, the aerial vehicle continues to rotate (e.g., assuming that there are no drag forces) after t=5 at a constant angular velocity, as shown by yaw 702.

Additionally, there is a difference between the total value of power supplied to the left-hand side, or port propulsion units 600-1 and 600-3 and the right-hand side, or starboard propulsion units 600-2 and 600-4. The result is a net torque on the aerial vehicle that causes roll 704 that is toward the right. It should be noted that the aerial vehicle experiences both a net torque in the yaw axis and the roll axis in synchrony as a result of turning input that is received from, for example, a single axis steering input device. That is, for example, the change in yaw 702 and change in roll 704 is produced as an automatic and synchronized response to a turning input that is associated with a single axis, a single dimension, or a single degree of freedom. The synchronized yaw and roll response caused by the turning input is enabled by momentum alignment correction processes, and results in the directionality of the momentum of the aerial vehicle being aligned with the direction of the aerial vehicle throughout the turn shown in FIG. 7.

It should be appreciated that pitch 706 is shown to remain at 0° because the simulations provided in FIG. 7 assume a lack of drag for the sake of illustration. In practice, there may indeed be a pitch command to accelerate the aerial vehicle to counteract the effects of drag.

Figure 8:
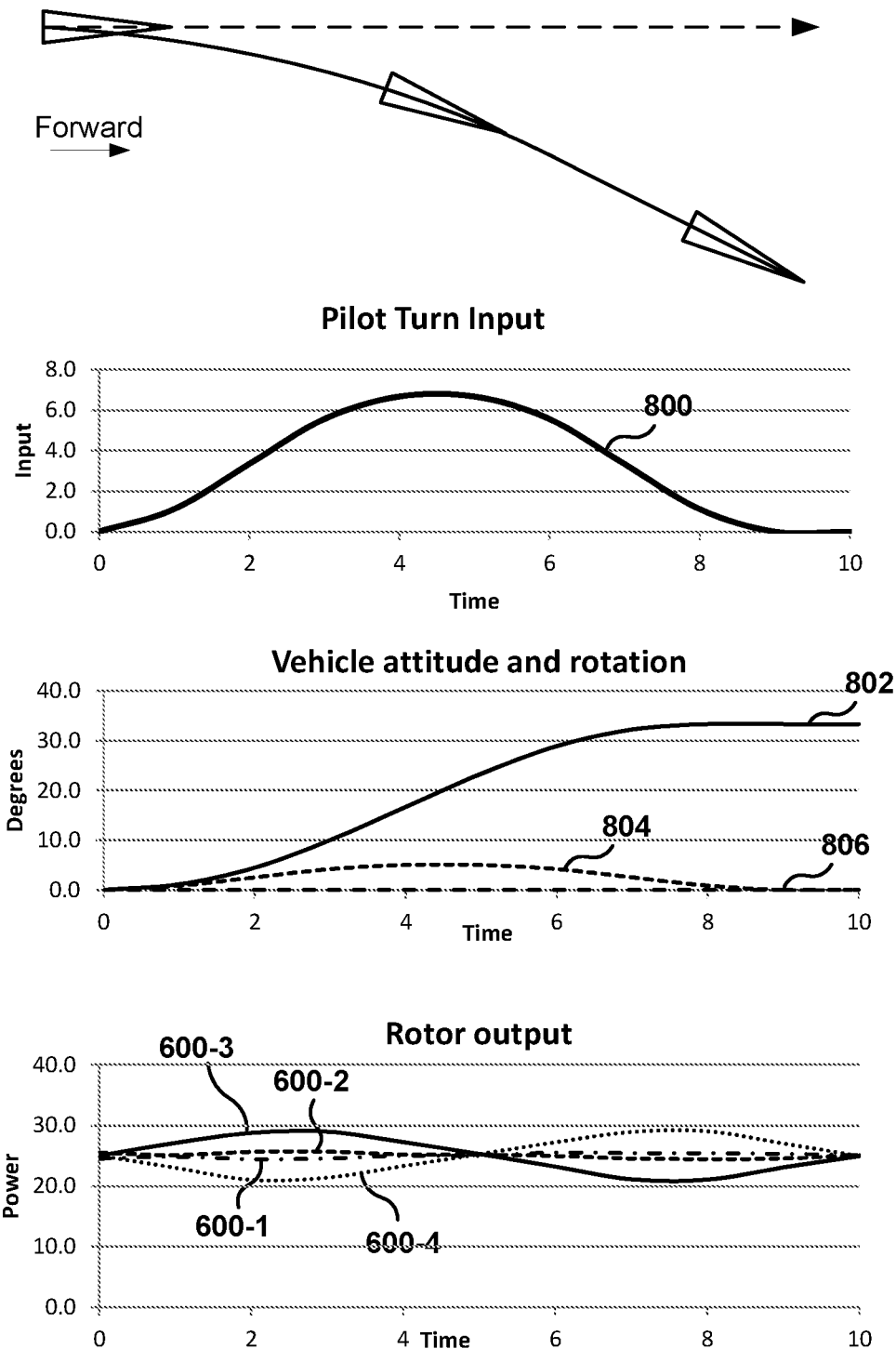
FIG. 8 shows a simulation how momentum alignment correction enables an aerial vehicle to complete a turn at a relatively lower speed while maintaining alignment between its momentum vector and its directionality vector during the completed turn, according to one embodiment.

FIG. 8 shows a completed 33.3° turn by an aerial vehicle using momentum alignment correction at a relatively lower speed (e.g., as compared to the same aerial vehicle completing a 33.3° turn at a higher speed). For illustrative purposes, the diagrams shown in FIG. 8 assume that no drag forces are experienced by the aerial vehicle. Similar to FIG. 7, the aerial vehicle is shown to be traveling in a forward direction (e.g., in a direction of 0°) before receiving a turn input. The turn input 800 may be produced by a single axis steering mechanism such as a steering wheel, a handle bar, joystick, or the like. The turn input 800 is shown to increase from 0 arbitrary units between t=0 to about t=4.5, reach a maximum at around t=4.5, and decrease to about 0 arbitrary units at around t=9. Such a turn input may be representative of a "completed" right turn in which the operator desires a to produce a certain degree of turn and then terminate the turn (e.g., to return to going straight forward).

Accordingly, yaw 802, roll 804, and pitch 806 associated with the aerial vehicle throughout the completed turn are shown to result from the turn input 800. Similar to in FIG. 7 yaw 802 is shown to increase nonlinearly at the outset of the turn, for example, between about t=0 and about t=4. This nonlinear increase in yaw 802 is in response to the increasing magnitude of the turn input 800 and represents an angular acceleration. At about t=4.5, the aerial vehicle reaches a maximum rotational velocity, which corresponds roughly to the time in which the turn input 800 reaches a maximum. In response to the decreasing turn input 800 between about t=4.5 and about t=9, the rate of rate of increase of yaw 802 decreases until at about t=9, yaw 802 reaches and remains at about 33.3°.

Also in response to the turn input 800, roll 804 is shown increase between t=0 and t=4.5. At t=4.5, a maximum roll is reached at about 5°, and between about t=4.5 and about t=9, roll 804 is shown to decrease. At about t=9, roll is shown to be 0°. As noted above, momentum alignment correction processes ensure that the aerial vehicle's momentum vector is aligned with its direction vector throughout the 33.3° turn. To achieve such an alignment, the roll 804 is shown to increase simultaneously with the increase to the change in yaw 802 at the outset of the turn in order to provide a transversal momentum component to the aerial vehicle. For example, if the aerial vehicle has a yaw of 10°, then a roll component may provide a thrust that is transverse to 10°, for example, 100°. As the aerial vehicle continues to change in yaw, so will the direction of force or thrust that the roll component provides.

As noted above, one way to execute momentum alignment control is to produce a roll component that is proportional to the angular velocity of the aerial vehicle. That is, for example, a sharper turn (e.g., higher angular velocity) requires a larger roll component than a gentler turn (e.g., lower angular velocity). As a result, when angular velocity is at a maximum at t=4.5, the roll 804 reaches a maximum as well. And when angular velocity is at 0, the roll 804 also has a value of 0°. Moreover, if there is an exponential change in yaw, there may also be an exponential change in roll.

FIG. 8 also shows the power that is supplied to propulsion units 600-1 through 600-4 for the duration of the completed turn. Similar to FIG. 7, the difference in output between counter-clockwise rotating propulsions units 600-2 and 600-3 and clockwise rotating propulsion units 600-1 and 600-4 results in a net clockwise torque on the aerial vehicle. The net clockwise torque causes the illustrated change in yaw 802 in the clockwise direction between about t=0 and about t=5. After t=5, there is a net counter-clockwise torque that decelerates the angular velocity of the aerial vehicle until the angular velocity decreases to zero after "completing" the turn.

Likewise, similar to FIG. 7, the total value of power being output to the port propulsion units 600-1 and 600-3 is higher than that of the starboard propulsion units 600-2 and 600-4 between t=0 and t=5, which causes increasing roll 804 shown in FIG. 8. After about t=5, the total power output of the starboard propulsion units 600-2 and 600-4 become greater than that of the port propulsion units 600-1 and 600-3. As a result, the roll 804 of the aerial vehicle begins to decrease. Thus, during about t=5 through t=10, the aerial vehicle begins to straighten back out to complete the turn.

Figure 9:
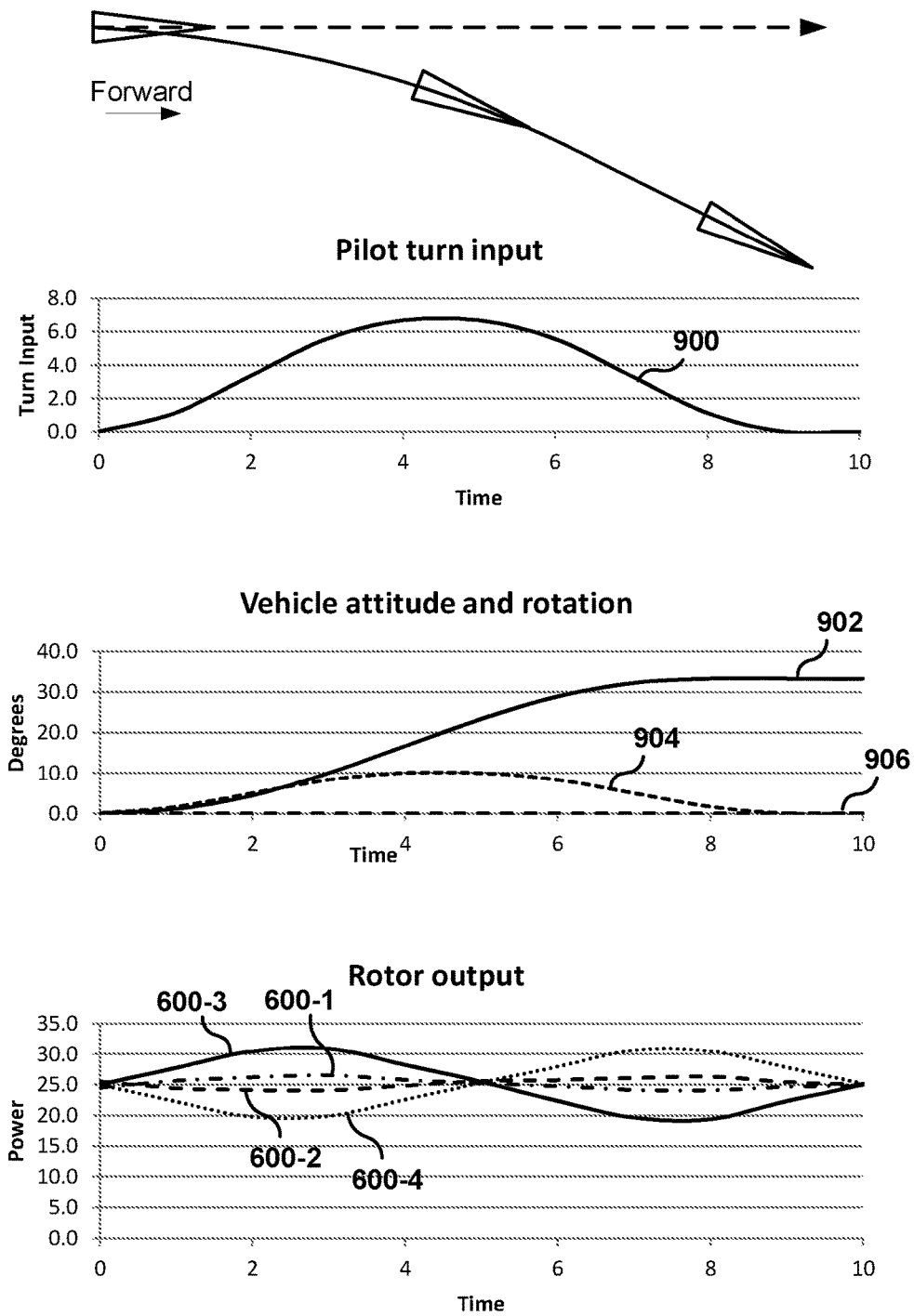
FIG. 9 shows a simulation how momentum alignment correction enables an aerial vehicle to complete a turn at a relatively higher speed while maintaining alignment between its momentum vector and its directionality vector during the completed turn, according to one embodiment.

FIG. 9 shows an aerial vehicle completing a 33.3° turn at a greater speed than the aerial vehicle of FIG. 8. The turn input 900 is similar to the turn input 800 of FIG. 8, which produces a yaw 902 that is similar to the yaw 802 of FIG. 8. However, unlike in FIG. 8, the roll 904 is shown to increase much faster and reach a maximum that is almost twice the magnitude of the maximum roll 804 of FIG. 8. Thus, the roll 904 is function of both speed and of angular velocity of the aerial vehicle. In the embodiment shown, the roll 904 is shown to increase at a greater rate than yaw between about t=0 and t=2. The roll 904 is required to increase faster and to a higher maximum at relatively higher speeds because a greater transversal force is required to change the direction of momentum for an aerial vehicle that is traveling faster than one traveling slower in an initial direction. Thus, the roll component or the amount of transversal momentum generated by the roll component may be proportional to momentum of the aerial vehicle in addition to being proportion to its angular velocity.

The rotor outputs of propulsion units 600-1 through 600-4 reflect the increased roll component required to maintain the alignment between the directionality of the momentum and the direction of the aerial vehicle. It is noted that the power curves for the propulsion units 600-1 and 600-2 have qualitatively swapped places in FIG. 9 as compared to FIG. 8 due to the increased momentum associated with the aerial vehicle going into the turn.

Figure 10:
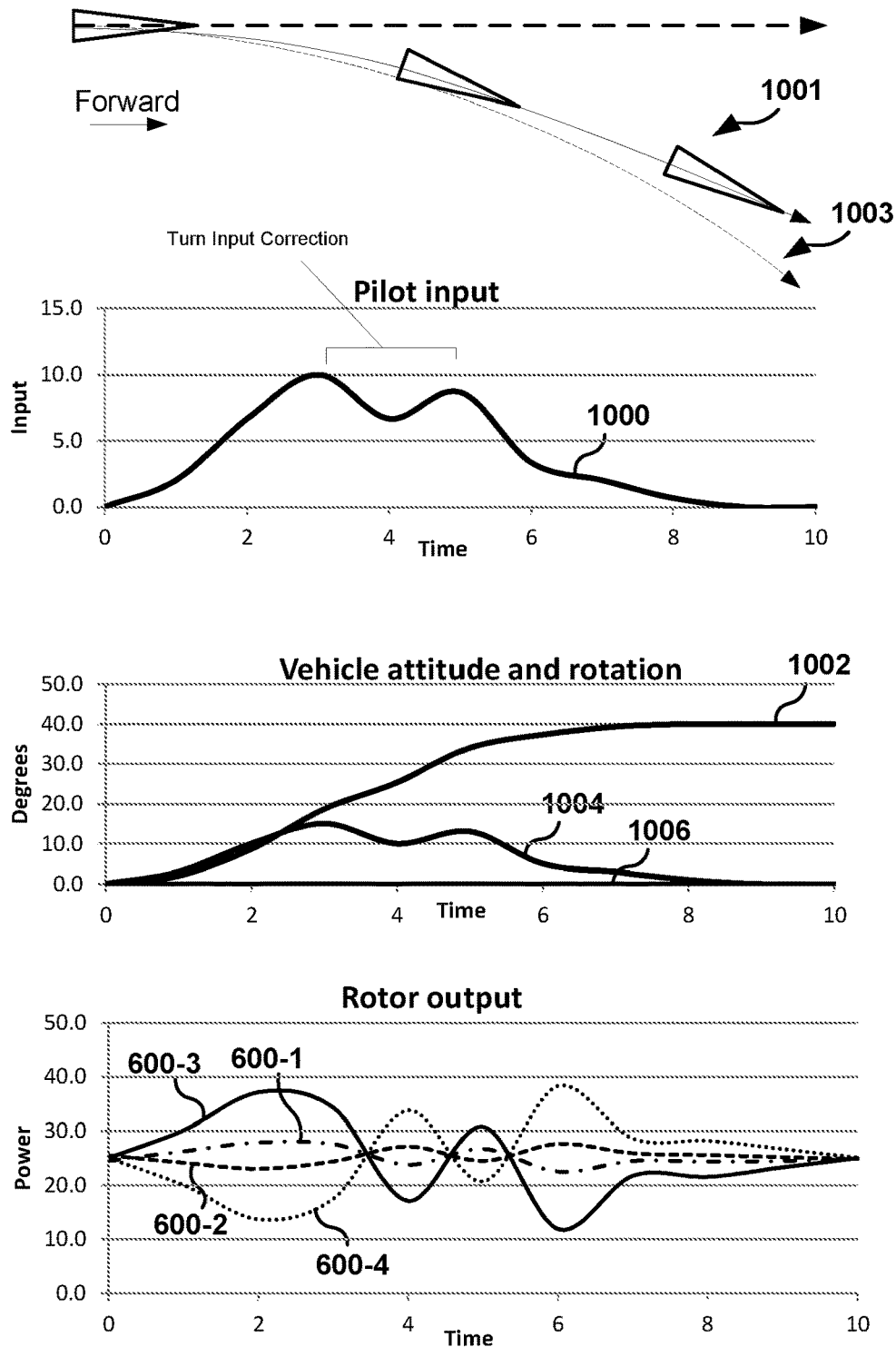
FIG. 10 shows a simulation of how momentum alignment correction enables an aerial vehicle to perform a variable turn with course correction while maintaining the aerial vehicle's momentum vector with its directionality vector during the variable turn, according to one embodiment.

FIG. 10 illustrates a completed turn of an aerial vehicle in response to a varying turn input using momentum alignment correction processes. The type of turn input 1000 and the resulting turn may be a result of an operator who performs one or more corrections during the course of a turn, for example. The flight path 1001 is shown to be not as smooth as flight path 1003, the latter of which describing a trajectory the aerial vehicle would take were it not for the turn input correction between about t=3 and about t=5.

The aerial vehicle is traveling forward with some momentum when a sharp turn input is received. The turn input reaches a maximum at around t=3, after which the pilot corrects and reduces the magnitude of the turn between about t=3 and about t=4. This may be the case when the pilot turns too aggressively initially and produces a turn output that is greater than what is desired and reduces the turn input in response. While the turn input 1000 is reduced during this period, it does not decrease to 0 turn input, and so the aerial vehicle remains turning throughout the duration shown (e.g., t=0 to t=10). At around t=4, the turn input 1000 is increased again before the turn is terminated and the turn input is reduced to 0.

FIG. 10 shows the yaw 1002, roll 1004, and pitch 1006 that is produced by momentum alignment correction processes in response to the turn input. Because the forward momentum of the aerial vehicle is relatively high prior to and during the turn, the roll 1004 is shown to increase at a higher rate than the yaw 1002 between about t=0 and t=2. Roll 1004 is shown to reach a maximum at around t=3, which corresponds to the time point at which the turn input 1000 is maximal. Roll 1004 decreases between about t=3 and about t=4 due to the reduced magnitude of the turn input 1000 during the same period. Roll 1004 increases once again between about t=4 and t=5 in response to the increased turn input 1000 during the same period. After t=5, the roll 1004 decreases until the turn input 1000 reaches zero and when the angular velocity of the aerial vehicle no longer changes.

It should be noted that while the turn input 1000 is shown to cause a change in the roll 1004 and the yaw 1002 characteristics of the aerial vehicle, the roll 1004 component is not an external or manual input made by the pilot. Instead, the roll 1004 component is mapped from the turn input 1000, which may be from a single axis turning input. The creation of the roll 1004 component from a turn input 1000 that is related to rotation or change in yaw is accomplished by momentum alignment correction. Without momentum alignment correction, a turn input will create a change only in yaw, and, as a result, no change in roll will be produced from the turn input. As a further result, the direction of the aerial vehicle's momentum will not be aligned with the direction the aerial vehicle is facing. One of the technological advantages of momentum alignment correction is ensuring the aerial vehicle's direction of momentum is consistently aligned with the direction it is facing. FIG. 10 demonstrates the capabilities of momentum alignment correction in maintaining such an alignment even when the turn input is not smooth. Embodiments described herein are enabled by momentum alignment correction to maintain an aerial vehicle's momentum vector with its direction vector for various types of turns. The rotor output for each of the propulsion units 600-1 to 600-4 are also shown in FIG. 10.

Each of the power curves for propulsion units 600-1 through 600-4 are shown to cross the power=25 line several times. For example, at around t=3.5, each of the power curves are shown to cross the power=25 line, which happens again at about t=4.5 and t=5.5. The power curves reverse in the first instance at t=3.5 due to the decreased pilot turn input shown at around t=3, which requires that the aerial vehicle's yaw momentum be slowed down. At around t=4, the pilot's turn input is shown to increase again, which causes the yaw momentum of the aerial vehicle to be sped back up. As a result, at about t=4.5, each of the power curves for propulsion units 600-1 through 600-4 again cross the power=25 line such that the vehicle's angular momentum in the yaw axis is again increased for a sharper turning radius. The power curves of propulsion units 600-1 through 600-4 again cross power=25 line at about t=5.5 in response to the decreased pilot turn input at around t=5.

Figure 11A:
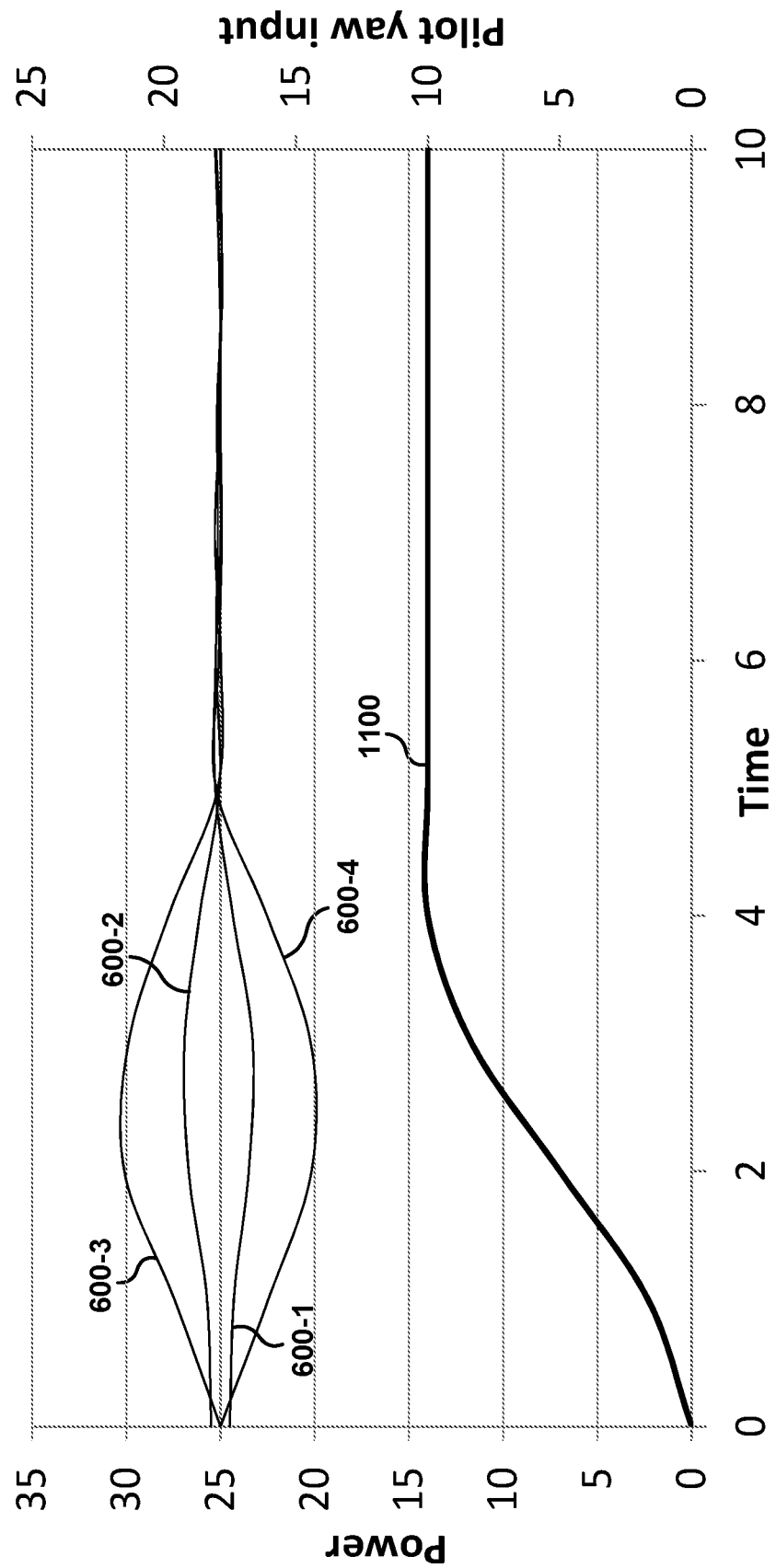
FIGS. 11A and 11B show how turn inputs are mapped in real time to power distribution curves for supplying power to various propulsion units using momentum alignment correction for a turn in progress and a completed turn, respectively, according to various embodiments.
Figure 11B:
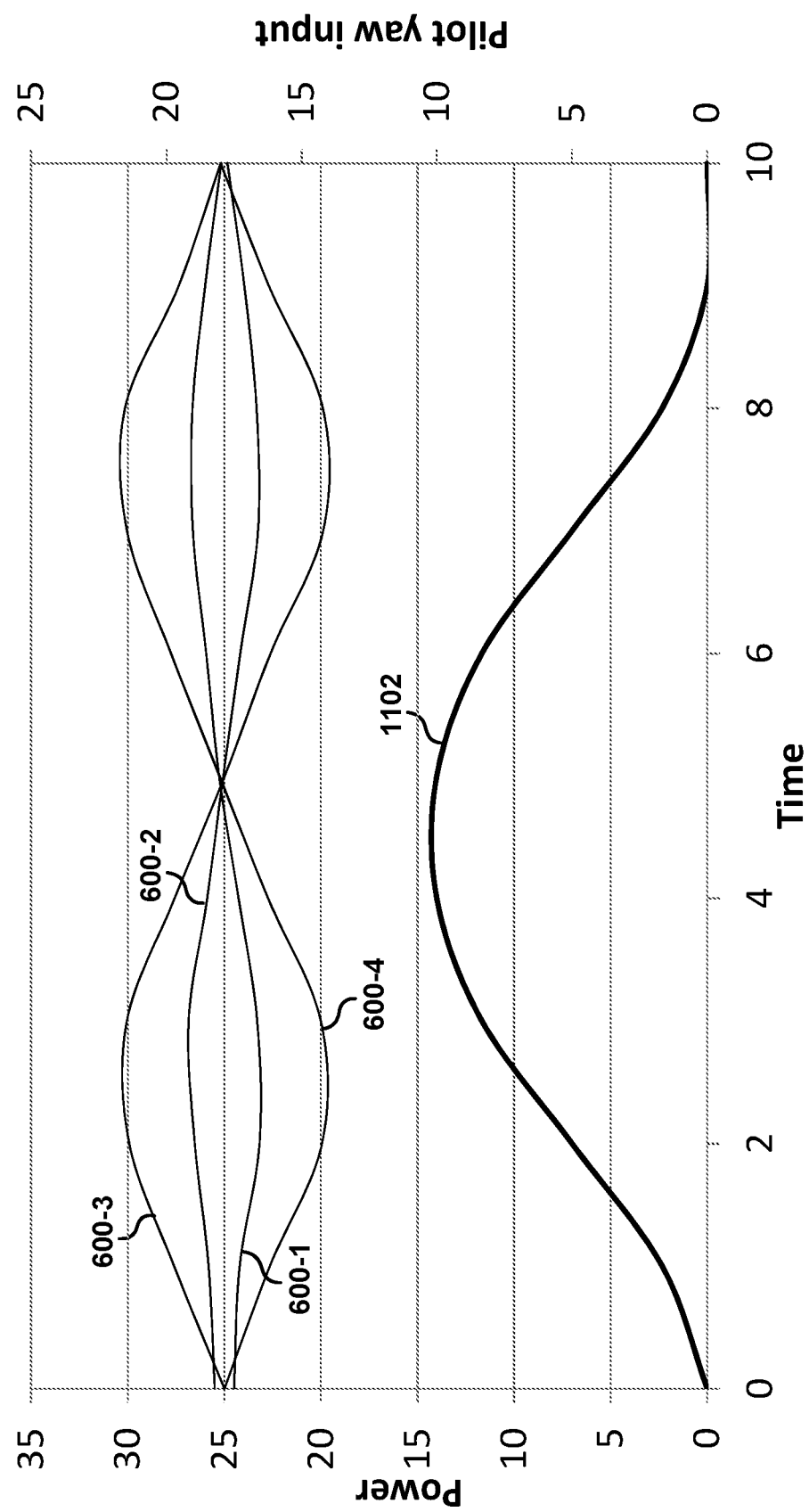

FIGS. 11A and 11B show how a flight computer in communication with or including a momentum correction module is able to map various turn inputs to power output signals that are sent to propulsion units 600-1 to 600-4. FIG. 11A, for example, shows an embodiment of an aerial vehicle that receives turn input 1100 and maps, in real time or near real time by a momentum alignment correction module, to power signals that are supplied to the propulsion units 600-1 through 600-4. The turn input is shown to increase between t=0 to about t=4.5, after which point the turn remains steady. Thus, the turn input 1100 may represent a sustained turn. For example, a sustained turn such as that shown in FIG. 11A may result in the aerial vehicle turning perpetually such that it follows a circular trajectory. FIG. 11B shows an embodiment of how a turn input 1102 for a completed turn is mapped by a momentum alignment correction module to propulsion units 600-1 to 600-4.

Figure 12A:
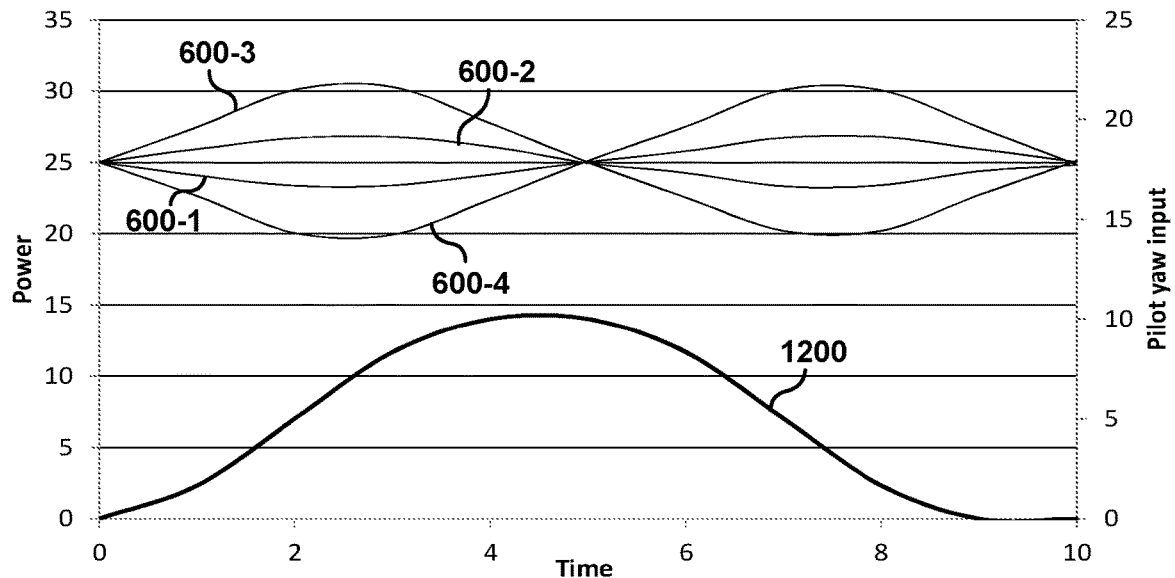
FIGS. 12A and 12B show how turn inputs are mapped in real time to power distribution curves for supplying power to various propulsion units using momentum alignment correction for a completed turn at a relatively lower speed and a relatively higher speed, respectively, according to various embodiments.
Figure 12B:
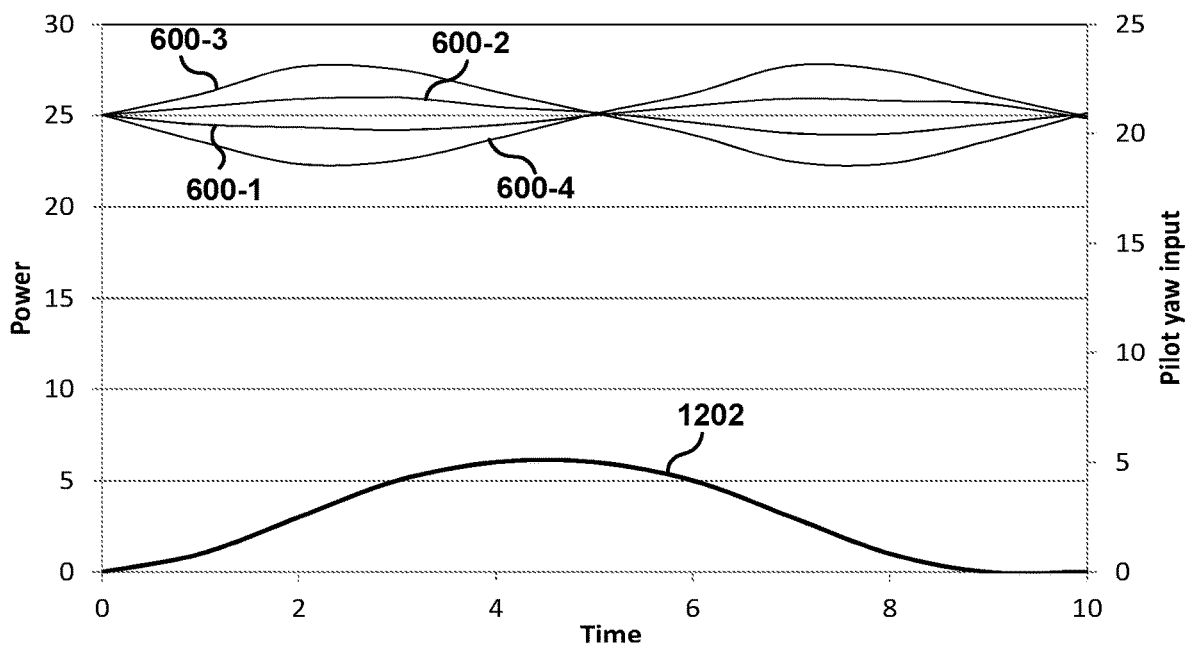

FIGS. 12A and 12B show certain difference between the mapping processes provided by the momentum alignment correction module for an aerial vehicle that is directed to complete a large (e.g., sharper turn) turn in FIG. 12A as compared to a similar aerial vehicle that is directed to complete a smaller (e.g., gentler turn). FIG. 12A shows a turn input 1200 that is sharper than the turn input 1202 of FIG. 12B. Generally speaking, sharper turns (e.g., turn input 1200) require a greater angular velocity, and therefore a greater net torque on the aerial vehicle. Due to the greater angular velocity required for sharper turns, a greater roll component is also required in order to provide a greater amount of transversal propulsion to "correct" the momentum of the aerial vehicle such that the directionality of the momentum aligns with the direction the aerial vehicle is facing in real time. When an aerial vehicle turns faster, a greater magnitude of roll is generally required to produce the change in momentum directionality that is simultaneous or near simultaneous to the change in the direction the aerial vehicle experiences. In some embodiments, there may be a lag between matching or correcting an aerial vehicle's momentum vector with its direction vector. It is envisioned that momentum alignment correction is to be able to correct an aerial vehicle's momentum vector with its direction vector within about 0 seconds (e.g., real time) to about 2 seconds, or about 0.01 seconds and about 1 second, or about 0.1 seconds and 0.5 seconds. In some embodiments, the "time to alignment" (e.g., the time it takes to align an aerial vehicle's momentum vector with its direction vector) small enough such that the operator feels as though alignment is achieved in real time. It is contemplated that as long a time to alignment is achieved within about half of a second or less, then the operator may not be able to distinguish the time to alignment with real time alignment. In other embodiments, the time to alignment may be configured to less than 0.5 seconds.

In various embodiments, momentum alignment correction processes and modules are also enabled to preemptively change an aerial vehicle's momentum vector in response to a predicted change in directionality vector. That is, for example, an aerial vehicle turning clockwise and predicted to continue to turn clockwise may be provided with a traversal thrust that preemptively increases the aerial vehicles lateral momentum such that the momentum vector changes ahead of the change in directionality vector.

Figure 13A:
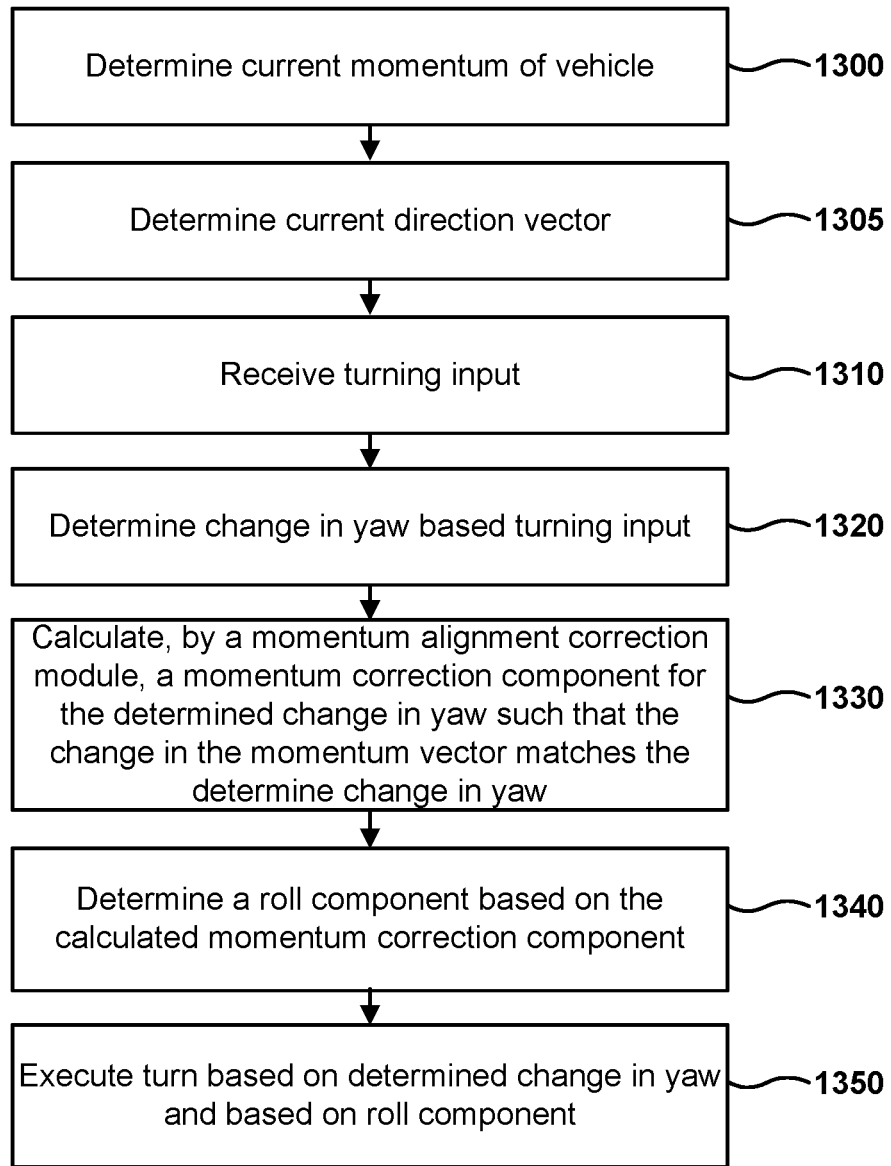
FIG. 13A shows an overall flow of a method embodiment for executing momentum alignment correction for turning an aerial vehicle, according to one embodiment.

FIG. 13A shows an overall flow of an embodiment for executing a turn using momentum alignment correction to maintain an aerial vehicle's momentum vector with its directionality vector during the turn. Operation 1300 serves to determine the current momentum of the vehicle. In various embodiments, operation 1300 may obtain the current momentum of the vehicle based on accelerometers, GPS tracking, motion detectors, radar, infrared sensors, magnetic sensors, among other ways to obtain a vehicle's current momentum. By determining the vehicle's momentum, operation 1300 contemplated to determine both the magnitude and the direction of the vehicle's momentum.

Generally, operation 1300 will also require a measurement for the mass of the vehicle to determine the current momentum. In some embodiments, it is envisioned that the mass of the vehicle may be estimated from overall power consumption of the vehicle on takeoff after adjusting for altitude and temperature. In other embodiments, the mass of the vehicle may also be determined from load cells or from a user-inputted value. In yet other embodiments, the mass could be determined or inferred in flight by measuring the amount correction required during the first turn the vehicle makes from a set of assumptions or default values. Assume, for the sake of example, that the mass of the vehicle is 100 kg and that it is traveling 1 meter/second in the 0° direction. Operation 1300 is thus able to calculate its momentum to be 100 kg×m/s.

According to the embodiment of FIG. 13A, operation 1305 serves to determine a current direction vector of the vehicle (e.g., orientation). That is, operation 1305 serves to detect which way the vehicle is facing, since it may be the case that the (aerial) vehicle does not face the same direction that it travels. If it is assumed that the aerial vehicle does travel in the same direction that it faces, then following the example provided in the preceding paragraph, operation 1305 may determine that the vehicle is facing in the 0° direction.

If, on the other hand, the momentum is not aligned with the direction of the vehicle prior to the turn, an addition momentum correction component may be computed in operation 1330 to adjust the roll component needed to (a) correct for the detected difference in the momentum vector and the direction vector as calculated by operations 1300 and 1305, respectively, as well as to (b) implement a momentum alignment correction component as calculated by operation 1320.

At operation 1310, the method receives a turn input, for example, from an operator who is riding or driving the vehicle. The turn input received in operation 1310 may be transduced from a mechanical change in, for example, a steering mechanism such as a steering wheel, handlebars, joystick, etc., into an electric signal. In certain embodiments, the turning input received by operation 1310 is from a single axis turning or steering input mechanism. As noted above, a single axis turning or steering input mechanism is operable as an input device that provides input in one-dimensional space. For example, a steering wheel or handle bars maybe characterized as single axis turning or steering mechanisms because the input produced by such input mechanisms is confined to one dimensional space.

According to the embodiment shown in FIG. 13A, operation 1320 determines a change in yaw based on the turning input. For example, if the vehicle is traveling at 0° and receives a certain turn input, operation 1320 determine that change in yaw that such a turn input will produce. For example, a clockwise turn input of a particular magnitude may result in a change in yaw, or angular velocity of, for example, 10°/second. Thus, the vehicle is able to complete a 90° turn in about 9 seconds.

In operation 1330, the method includes calculating by a momentum alignment control module, a momentum correction component for the determine change in yaw such that the change in momentum vector matches the determined change in yaw. For example, the momentum alignment correction module in operation 1330 may calculate how much change in momentum is required to change the momentum vector at a rate of 10°/second in order to align the momentum vector with the change in yaw. To effect a change in the momentum vector at a rate of 10°/second (e.g., to match the change in the direction vector), operation 1330 may determine that the vehicle is to produce a transversal thrust or force of about 17.36 kg×m/s². This thrust, propulsion, or force in the transverse direction (e.g., to the right of forward) may be referred to the momentum correction component, since it refers to a component of thrust that changes the directionality of the momentum vector of the vehicle.

If it is the case that the momentum vector and the direction vector are not aligned prior to receiving the turning input at operation 1310, operation 1330 may also calculate an additional momentum correction component that is to be implemented to correct for the initial non-alignment. As a result, operation 1310 may produce a momentum correction component that corrects for both the initial non-alignment as well as the non-alignment would be created by the turn input.

In operation 1340, the method includes determining a roll component based on the calculated momentum correction component of 17.36 kg×m/s². For example, operation 1340 will determine to what degree the vehicle should roll to right to produce the momentum correction component. Depending on various parameters, operation 1340 may determine that a roll component should be an 8.8° roll to the right. Generally, operation 1340 will determine an amount of roll that should be executed without affecting the thrust of the vehicle in the direction of gravity. In operation 1350, the method includes executing the turn based on the determine change in yaw as communicated by the turning input received in operation 1310 and based on the roll component determined in operation 1340. Operation 1350 is therefore configured to control a distribution of power to the propulsion units such that the vehicle is caused to experience a change in yaw at about 10°/second as well as a roll component of about 8.8°. As a result, the momentum vector of the vehicle experiences an angular change of 10°/second, which matches the vehicle's change in yaw of 10°/second.

The resulting turn that is executed by the method of FIG. 13A is such that the vehicle's momentum vector is consistently aligned with its directionality vector. From the operator's point of view, the vehicle travels in the same direction as it faces throughout the turn. For an operator, the flight behavior and characteristics of a vehicle being operated in conjunction with the method shown in FIG. 13A is intuitive because the vehicle travels in the same direction that it faces, similar to the behavior of ground vehicles. Thus, the method represents an improvement to current aerial vehicles and control systems thereof. For example, when an aerial vehicle piloted by a human travels in a direction that it does not face (e.g., the vehicle travels in the 90° direction but faces the 0° direction), confusion and unwanted results may occur. Embodiments contemplated here ensure that when an aerial vehicle faces a certain direction and has some momentum, the momentum will continually be in the same direction that the vehicle faces. Other embodiments contemplated here are enabled to control an aerial vehicle in a way that mimics how ground vehicles or friction-based vehicles are controlled. Namely, embodiments envisioned here mimic the ground vehicle's ability to align its momentum vector with its direction vector.

Figure 13B:
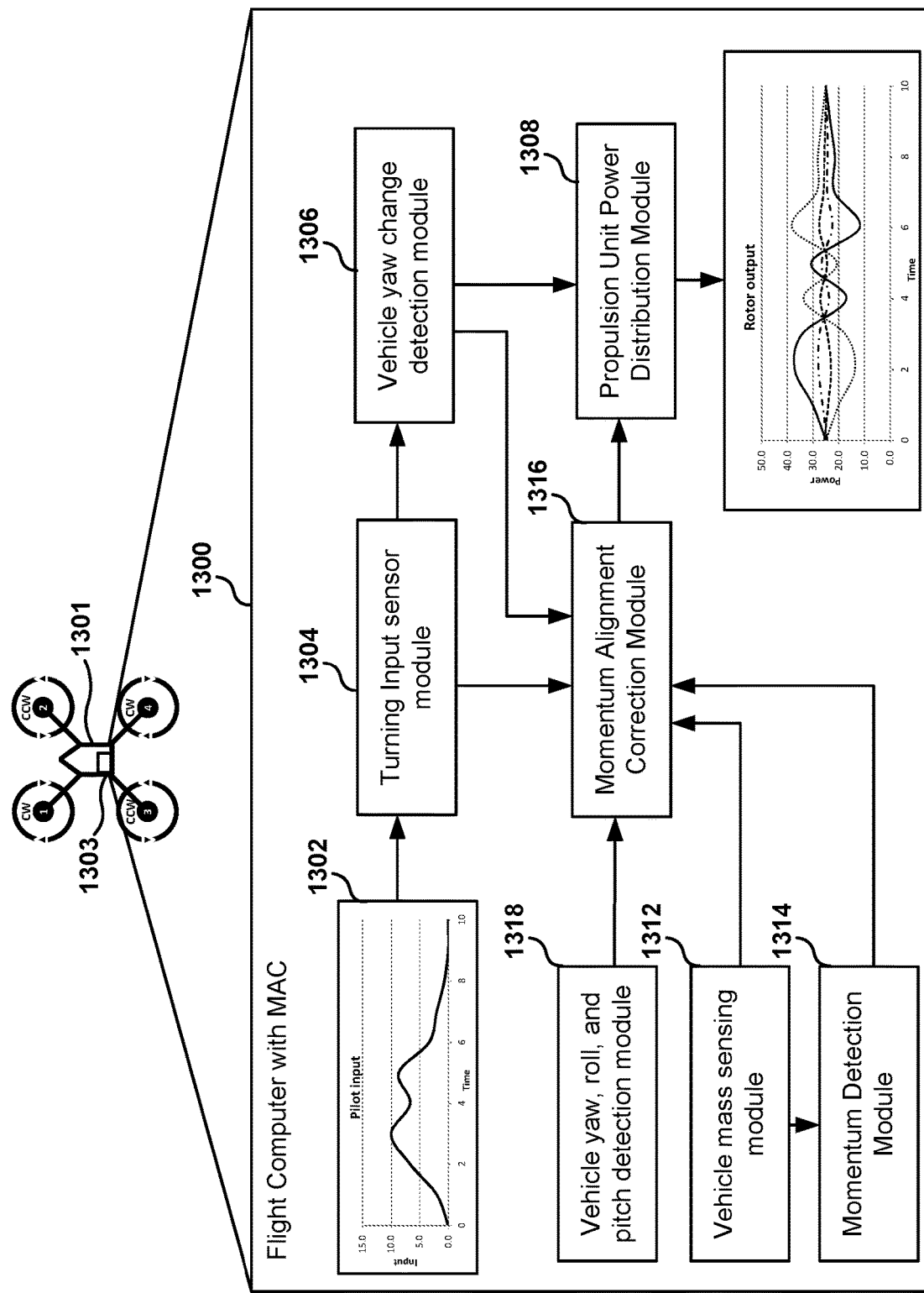
FIG. 13B shows an embodiment of a flight computer of an aerial vehicle that is enabled to carry out momentum alignment correction processes, according to one embodiment.

FIG. 13B illustrates an aerial vehicle 1301 and certain associated components of its flight computer 1300. The flight computer is shown to receive pilot input 1302, which is processed by turning input sensor module 1304. In certain embodiments, the pilot input 1302 is produced from a single axis turning input mechanism such as handlebars, a joystick, or a steering wheel. Turning input sensor module 1304 processes the raw pilot input 1302 signal into computer-readable signals related to the directionality and the magnitude of the pilot input 1302. The computer-readable turning signals related to the pilot input 1302 are processed by a vehicle yaw change detection module, which calculates the change in yaw that is to be produced by the pilot input 1302 in real time or near real time. Propulsion unit power distribution module 1308 calculates and maps the amount of power that should be delivered to each of the four propulsion units to accomplish the calculated change in yaw, or however many propulsion units are included in various embodiments.

The momentum alignment correction module 1316 is shown to receive inputs from the turning input sensor module 1304, the vehicle yaw change detection module 1306, the vehicle yaw, roll, and pitch detection module 1318, the vehicle mass sensing module 1312, and the momentum detection module 1314. The vehicle mass sensing module 1312 may communicate with sensors that physically interpret the mass of the aerial vehicle, or may communicate with sensors that infer the mass of the vehicle from power consumption sensors or feedback loops. Signals from each of these sources are used to compute a momentum correction component that is to be executed by the propulsion unit power distribution module 1308 simultaneously to its executing the command received by the vehicle yaw change detection module 1306. More particularly, the momentum alignment correction module 1316 receives information to the current state of the vehicle from the vehicle yaw, roll, and pitch detection module 1318, and the current momentum of the vehicle from momentum detection module 1314. Additionally, the momentum alignment correction module obtains data related to the direction and magnitude of pilot input 1302 from the vehicle yaw change detection module 1306.

In the embodiment shown in FIG. 13B, the momentum alignment correction module 1316 is configured to calculate, in real time, the momentum correction component needed to produce a change in the momentum vector that matches the change in yaw. The momentum correction component, once calculated, is converted into a roll component, which represents an amount of roll that is to be executed to achieve the momentum correction needed to change the direction of the momentum of the vehicle at a rate that matches the change in yaw. The roll component calculated by the momentum alignment correction module 1316 is feed into the propulsion unit power distribution module 1308, which is responsible for combining the yaw command that is being received from the vehicle yaw change detection module 1306 and the roll command being received from the momentum alignment correction module 1316 and calculating the distribution of power that is to be sent to each of the propulsion units to achieve the received yaw command and roll command simultaneously. The propulsion unit power distribution module 1308, having calculated the distribution of power required achieving the yaw and roll command simultaneously, signals to the electronic speed controllers of each of the propulsion units to draw power from a battery supply (not shown) or other power supply that is in accordance with the calculated distribution of power.

It is noted that the components shown in flight computer 1300 and the processes they facilitate have been described sequentially for the sake of clarity. However, it will be understood that the abovementioned processes are occurring over a period of time in real time. Thus, the power distribution is a dynamical distribution. The yaw and roll commands are also dynamic inputs that change in real time depending upon the pilot input 1302, as well as external conditions.

Figure 14:
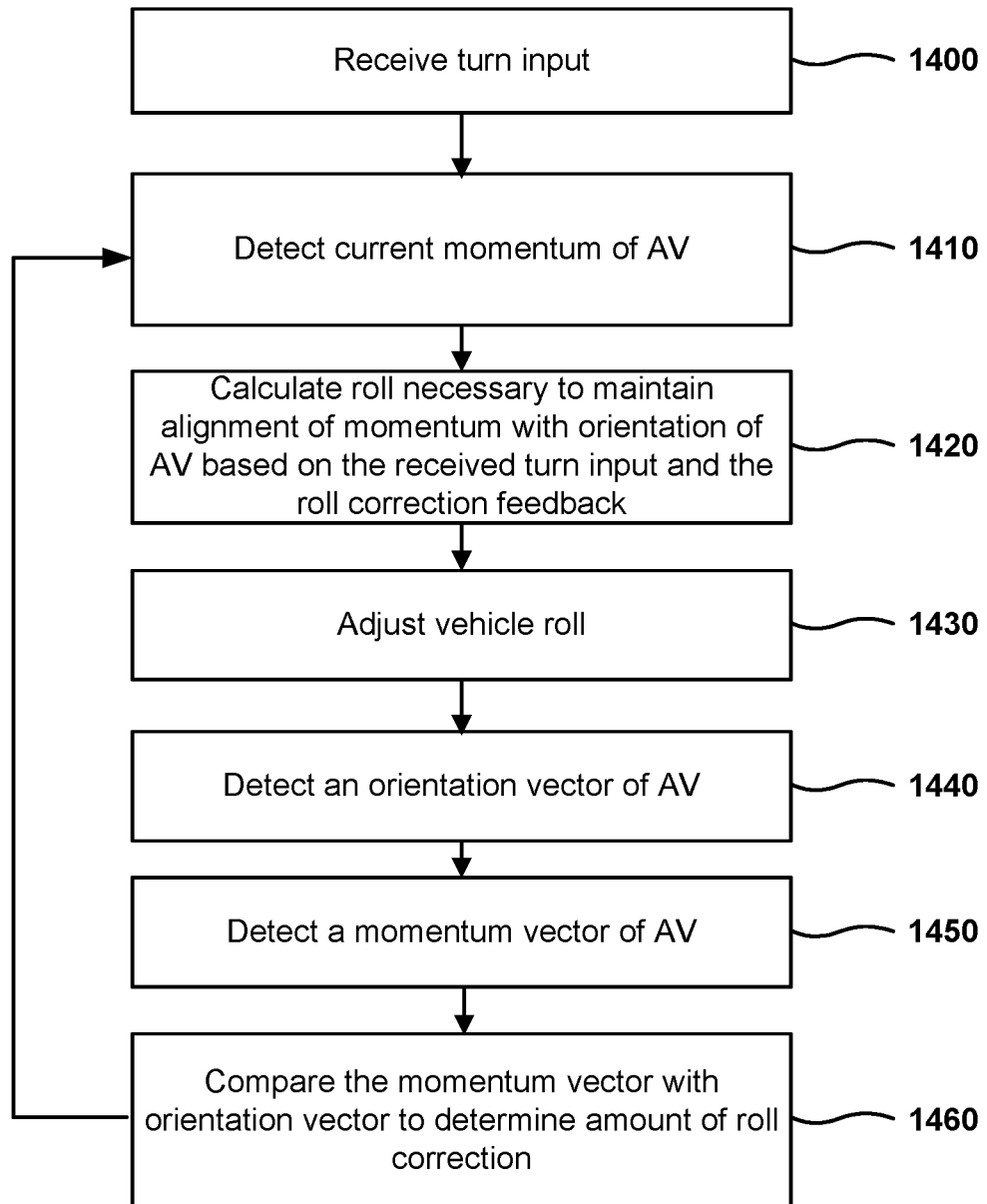
FIG. 14 shows an overall flow of a method embodiment for implementing momentum alignment correction in an aerial vehicle that is further enabled to make momentum corrections in response to detecting non-alignment between momentum and orientation of the aerial vehicle, according to one embodiment.

FIG. 14 shows a method for making momentum correction to an aerial vehicle when it is detected that momentum is not aligned with the orientation of the aerial vehicle (e.g., the direction the aerial vehicle is facing). In operation 1440, the orientation of the aerial vehicle is detected, for example, by GPS system. For example, operation 1440 may detect that the orientation of the aerial vehicle faces in the 0° direction. In operation 1450, the method detects the momentum vector of the aerial vehicle (e.g., the direction in which the vehicle is traveling). For example, operation 1450 may detect that the momentum vector of the aerial vehicle is directed in the 1° direction. The orientation obtained in operation 1440 is then compared to the momentum vector data obtained in operation 1450 in operation 1460, which is also operable to calculate an amount of correction in a roll component to compensate for the difference. If there is a difference, as there is in the current example, the amount of roll correction is calculated and used as feedback to operation 1410, which detects the current momentum of the aerial vehicle. Additionally, it is contemplated that in some circumstances for some embodiments that a pitch or yaw adjustment may be calculated by operation 1420 in order to cause the momentum vector of the aerial vehicle to be aligned with its direction vector.

Operation 1420 is configured to calculate a roll component necessary to maintain alignment between the momentum vector with the orientation of the aerial vehicle based on the received turn input. However, when there is a roll correction provided by operation 1460, operation 1420 calculates a roll that is necessary to satisfy both the received turn input as well the additional roll correction. In some situations, the roll correction may be additive to the calculated roll for the turn input if the momentum vector is "lagging behind" the orientation. As a result, a greater roll command will allow the momentum vector of the aerial vehicle to "catch up" to the orientation. In other situations, the roll correction may be negative and subtract from the calculated roll from the turn input, if, for example, the momentum vector has overshot the orientation of the aerial vehicle. In any case, the embodiment shown is enabled to make on-the-fly adjustments to the momentum vector of the aerial vehicle to create an alignment between the vehicle's momentum vector with its orientation.

In certain other embodiments, the moment of inertia may also be detected to determine the amount of angular force required execute respective desired roll commands and yaw commands. When the momentum of inertia is higher, it will generally take a greater amount of angular force to effect a desired roll command or a desired yaw command. Thus, in certain embodiments, the aerial vehicle may include one or more sensors for detecting the momentum of inertia in the yaw, roll, and pitch axes, which can be used by the flight computer to execute various roll and yaw commands, in addition to pitch commands.

Figure 15A:
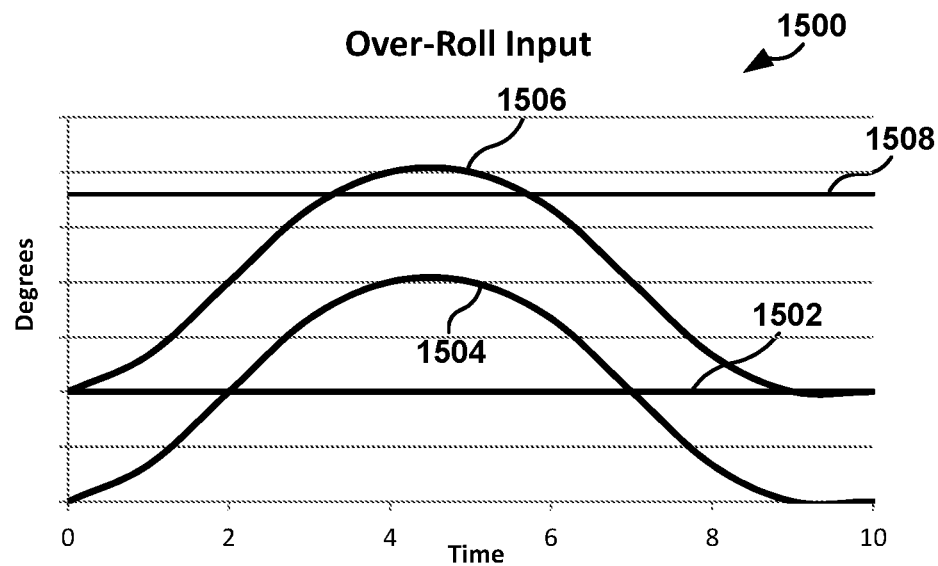
FIGS. 15A and 15B show embodiments of over-roll correction processes for an aerial vehicle, according to one embodiment.
Figure 15B:
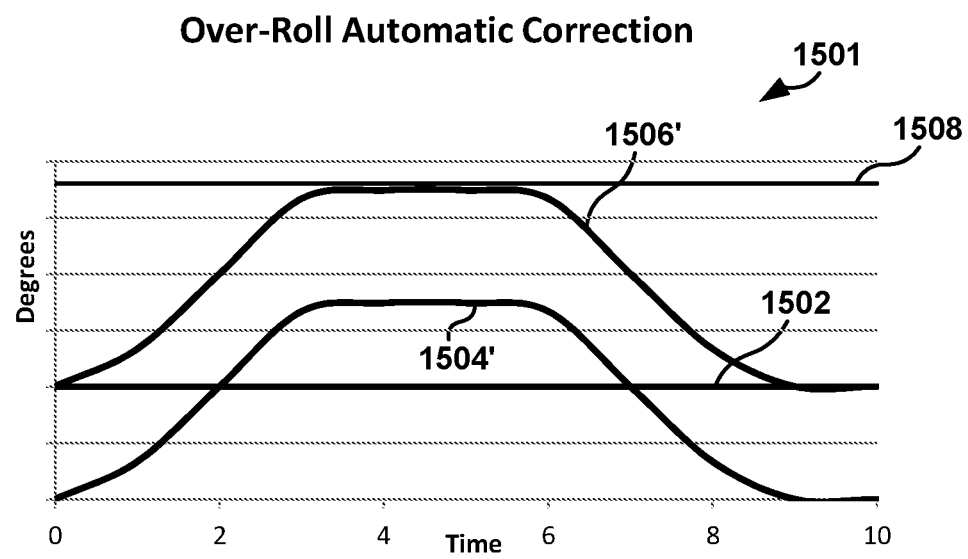

FIGS. 15A and 15B show embodiments that prevent an aerial vehicle from rolling past a desirable magnitude or degree, hereinafter referred to as over-roll, for example, during a turn. In certain situations, over-roll may not be desirable because it may cause a side of the aerial vehicle (e.g., the propellers) to become too close to the ground or other object. In other situations, over-roll may be problematic when the operator is being tilted to one side more than would be desirable.

In FIG. 15A, an aerial vehicle implementing momentum alignment control is given a yaw input that causes the aerial vehicle to turn. A steady manual roll input 1502 is shown to occur during the period t=0 to t=10. Additionally, a roll command 1504 as generated by the momentum alignment control (MAC) of the aerial vehicle is also shown. The threshold 1508 illustrates acceptable degrees of roll and unacceptable degrees of roll. Individually, neither of the manual roll input 1502 nor the MAC generated roll command 1504 surpass the threshold 1508. However, when a pilot commands both an external roll and a turning input, the combined roll 1506 may be greater than what is an acceptable roll.

One way to prevent over-roll 1500 such as that shown in FIG. 15A is to use over-roll automatic correction 1501, as shown in FIG. 15B. Over-roll correction or prevention involves continually monitoring the combined roll 1506' by monitoring the manual roll input 1504' and the MAC generated roll command 1504'. When the combined roll 1506' nears or is predicted to surpass the threshold 1508, the flight computer of the aerial vehicle may limit the yaw input, for example, by mechanically limiting the magnitude in which a single axis turning device can be turned or manipulated. As a result, the combine roll 1506' does not exceed threshold 1508. Alternatively, or additionally, the flight computer of the aerial vehicle may also limit the roll input so that the combined roll 1506' of the aerial vehicle does not exceed the threshold 1508.

Figure 16:
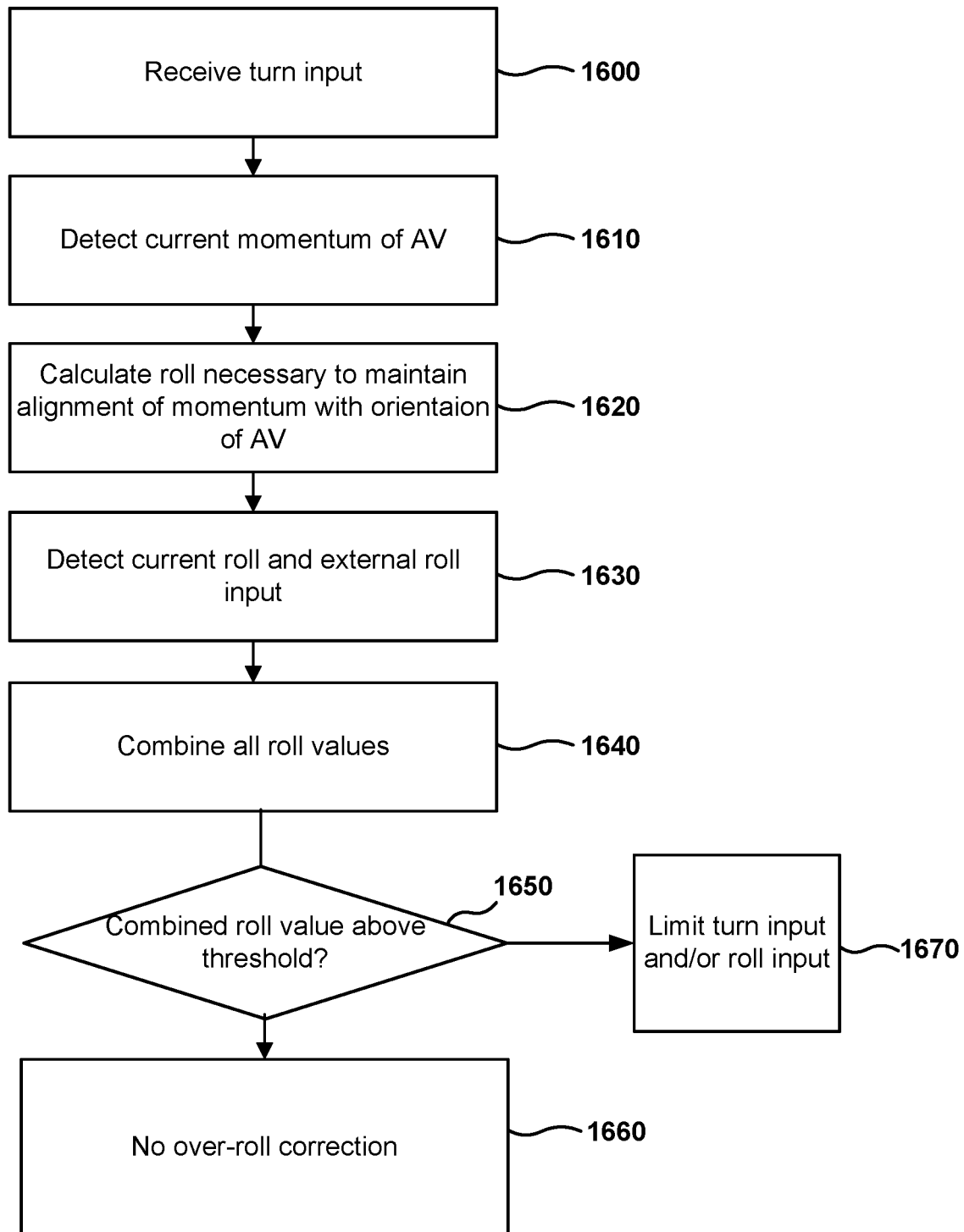
FIG. 16 shows a method embodiment for implementing over-roll correction or prevention in aerial vehicles, according one embodiment.

FIG. 16 shows a method for implementing over-roll correction or prevention in aerial vehicles such as those embodiments described herein. In operations 1600-1620, the method includes receiving a turn input, detecting a current momentum of the aerial vehicle, and calculating a roll necessary to maintain alignment of a momentum vector of the aerial vehicle with its orientation. In operation 1630, the method includes detecting a current roll as well as an external roll input. Operation 1640 combines all roll values detected by operations 1620 and 1630 to determine a combined roll value. If it found by decision 1650 that the combine roll value is above a given threshold, then the method proceeds to operation 1670, which serves to limit the turn input and/or the roll input that an operator is able to produce. If instead it is found that in decision 1650 that the combined roll value does not exceed a given threshold, then the method proceeds to operation 1660 does nothing to the limit the turn input.

For the sake of illustration, embodiments of flight characteristics, including yaw, pitch, roll, and rotor outputs have been purposefully isolated from certain external forces that may act upon the embodiments of aerial vehicles described herein such that the principles of implementing momentum alignment correction and over-roll correction may be better illustrated. It will be appreciated, however, that additional forces may act upon the aerial vehicle, and may therefore affect the illustrated yaw, pitch, roll, and rotor outputs shown in FIGS. 7-12B and FIGS. 13A and 13B. For example, forces caused by drag as well as forces caused by a pilot have been intentionally suppressed in order to better illustrate how principles of momentum alignment correction and over-roll correction should be implemented. In practice, however, it is noted that, for example, a pitch adjustment may be needed in various embodiments such that the aerial vehicle maintains speed or momentum throughout the turn.

Additionally, a pilot may produce forces on the aerial vehicle such as by shifting her weight side to side as well as fore and aft. As a result, the pilot may cause the center of gravity of the aerial vehicle to change. In addition to changing the center of gravity of the aerial vehicle, the pilot may also produce a torque on the vehicle. For example, in the hoverbike 500 embodiment shown in FIGS. 5A and 5B, a pilot that leans to the left or right may also torque the hoverbike 500 left or right (e.g., in the roll axis). Additionally, the pilot may torque the hoverbike 500 in the yaw and pitch axes. It is therefore contemplated that the flight computers used with embodiments described hereinabove are enabled to compensate for external forces experienced by the aerial vehicle.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processes of momentum alignment correction and over-roll correction are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims

What is claimed is:

1. A method for turning an aerial vehicle, the method comprising:
   receiving, at the aerial vehicle, a turning input;
   detecting a current momentum of the aerial vehicle;
   converting the turning input into a yaw command and calculating a change in yaw associated with the turning input;
   calculating, in response to the turning input, a roll command based on the current momentum of the aerial vehicle and based on the change in yaw associated with the turning input; and
   executing, by the aerial vehicle, the yaw command and the roll command in synchrony, wherein the executing the yaw command and the roll command in synchrony causes the aerial vehicle to perform a turn.

2. The method of claim 1, wherein when a momentum vector and an orientation vector associated with the aerial vehicle are in a state of alignment during the executing the yaw command and the roll command in synchrony for the turn, the momentum vector is defined by a directionality associated with a momentum of the aerial vehicle and the orientation vector is defined by a direction the aerial vehicle is facing.

3. The method of claim 2, wherein the state of alignment between the momentum vector and the orientation vector is defined by the momentum vector and the orientation vector being within 0° and 10° of each other.

4. The method of claim 1, wherein said calculating the roll command further includes:
   calculating a future momentum that will be associated with the aerial vehicle in response to the turning input; and
   determining a transversal momentum component based the difference between the future momentum and the current momentum of the aerial vehicle;
   wherein the roll command is further calculated based on the transversal momentum component.

5. The method of claim 1, wherein the executing the yaw command and the roll command in synchrony is such that the roll command is executed before the yaw command.

6. The method of claim 1, wherein the turning input is a yaw input produced by a single axis steering device.

7. The method of claim 6, wherein the single axis steering device includes a steering wheel, or a handlebar, or a joystick.

8. The method of claim 1, wherein the yaw command includes a signal that is operable to generate a torque on the aerial vehicle to produce the change in yaw via a plurality of propeller units of the aerial vehicle.

9. The method of claim 1, wherein the roll command includes a signal that is operable to generate a change in roll of the aerial vehicle via a plurality of propeller units of the aerial vehicle.

10. The method of claim 1, wherein the calculating the roll command further includes:
    determining a momentum correction component that is operable to change a momentum vector of the aerial vehicle at a similar angular rate to the change in yaw, and
    calculating a degree of roll for achieving the momentum correction component, wherein the roll command is based the degree of roll calculated and the roll command is executed by a plurality of propeller units of the aerial vehicle.

11. An aerial vehicle, comprising:
    one or more sensors for determining a momentum of the aerial vehicle;
    a single axis turning device for receiving yaw inputs;
    a body for supporting a pilot;
    a flight computer for converting the yaw inputs to yaw commands, the flight computer includes a momentum alignment correction module for generating roll commands operable to adjust a roll of the aerial vehicle based on the yaw commands and based on the momentum of the aerial vehicle; and
    a plurality of propulsion units for executing the yaw commands and the roll commands, the executing the yaw commands and the roll commands causes the aerial vehicle to navigate a turn.

12. The aerial vehicle of claim 11, wherein the momentum alignment correction module is configured to continually generate roll commands based on the yaw commands such that a momentum vector of the aerial vehicle and an orientation vector of the aerial vehicle are in a state a continual alignment during execution of the turn, the momentum vector is defined by a directionality associated with the momentum of the aerial vehicle and the orientation vector is defined by a direction the aerial vehicle is facing.

13. The aerial vehicle of claim 12, wherein the state of continual alignment between the momentum vector and the orientation vector of the aerial vehicle is such that the momentum vector and the orientation vector differ by no more than 10° during the turn.

14. The aerial vehicle of claim 11, further comprising:
one or more sensors operable to determine an orientation vector of the aerial vehicle, the orientation vector of the aerial vehicle is defined by a direction the aerial vehicle is facing.

15. The aerial vehicle of claim 14, wherein the momentum alignment correction module is further configured to detect a difference between a directionality of the momentum of the aerial vehicle and the orientation vector of the aerial vehicle, the momentum alignment correction module generates additional roll commands to reduce the difference between the directionality of the momentum of the aerial vehicle and the orientation vector.

16. The aerial vehicle of claim 11, wherein the roll commands are generated by the momentum alignment correction module without additional roll inputs.

17. The aerial vehicle of claim 11, wherein the single axis turning device includes a handlebar, or a steering wheel, or a joystick for producing the yaw inputs.

18. The aerial vehicle of the claim 17, wherein the single axis turning device further includes a brake lever, the brake lever is operable to produce a brake input, the brake input is converted into a pitch command or a roll command for slowing the aerial vehicle.

19. A method for controlling an aerial vehicle, comprising:
receiving a yaw input from a user of the aerial vehicle;
detecting a momentum of the aerial vehicle;
calculating, in response to the yaw input, a rate of a change in yaw of the aerial vehicle based on the yaw input;
calculating, in response to the yaw input, a roll command based on the yaw input and the momentum of the aerial vehicle, the calculating the roll command includes:
determining a change in a direction of the momentum required to match the rate of change in yaw of the aerial vehicle; and
executing, by propeller units associated with the aerial vehicle, the change in yaw and the roll command in unison.

20. The method of claim 19, wherein the executing the change in yaw and the roll command in unison causes the aerial vehicle to navigate a turn and wherein an orientation vector and a momentum vector of the aerial vehicle are aligned during the turn.

* * * * *